United States Patent
Abedini et al.

(10) Patent No.: US 11,595,927 B2
(45) Date of Patent: Feb. 28, 2023

(54) OVER-THE-AIR SYNCHRONIZATION IN MOBILE INTEGRATED ACCESS AND BACKHAUL COMMUNICATIONS

(71) Applicant: QUALCOMM Incorporated, San Diego, CA (US)

(72) Inventors: Navid Abedini, Somerset, NJ (US); Luca Blessent, Whitehouse Station, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/003,062

(22) Filed: Aug. 26, 2020

(65) Prior Publication Data
US 2021/0084606 A1    Mar. 18, 2021

Related U.S. Application Data

(60) Provisional application No. 62/900,257, filed on Sep. 13, 2019.

(51) Int. Cl.
*H04W 56/00* (2009.01)
*H04W 76/27* (2018.01)
(Continued)

(52) U.S. Cl.
CPC ..... *H04W 56/0045* (2013.01); *H04L 27/2607* (2013.01); *H04W 8/08* (2013.01);
(Continued)

(58) Field of Classification Search
CPC ............ H04W 56/0045; H04W 76/27; H04W 8/08; H04W 8/24; H04W 56/001; H04W 80/02;
(Continued)

(56) References Cited

U.S. PATENT DOCUMENTS 6,049,538 A * 4/2000 Scott ............ H04J 13/107
375/E1.018
2007/0293224 A1* 12/2007 Wang ............ H04W 56/001
455/436
(Continued)

FOREIGN PATENT DOCUMENTS

GB          2493707 A       2/2013

OTHER PUBLICATIONS

Huawei, et al., "On IAB Node Synchronization and Timing Alignment", 3GPP Draft, 3GPP TSG RAN WG1 Meeting #94, R1-1808087, 3rd Generation Partnership Project (3GPP), Mobile Competence Centre, 650, Route Des Lucioles, F-06921, Sophia-Antipolis Cedex, France, vol. RAN WG1, No. Gothenburg, Sweden, Aug. 20, 2018-Aug. 24, 2018, Aug. 10, 2018 (Aug. 10, 2018), XP051515489, 8 pages, Retrieved from the Internet: URL: http://www.3gpp.org/ftp/tsg%5Fran/WG1%5FRL1/TSGR1%5F94/Docs/R1%2D1808087%2Ezip [retrieved on Aug. 10, 2018] pp. 1-8.
International Search Report and Written Opinion—PCT/US2020/048147—ISA/EPO—dated Nov. 26, 2020.

*Primary Examiner* — Nghi H Ly
(74) *Attorney, Agent, or Firm* — Patterson + Sheridan, LLP

(57) ABSTRACT

Certain aspects of the present disclosure provide techniques for over-the-air synchronization of integrated access and backhaul communications. An example method that may be performed by a network entity includes receiving, from a first wireless node, an indication of a value of a timing adjustment factor associated with a communication between the first wireless node and a second wireless node and communicating with the first wireless node or the second wireless node based on the value of the timing adjustment factor.

30 Claims, 15 Drawing Sheets

(51) Int. Cl.
*H04L 27/26* (2006.01)
*H04W 8/08* (2009.01)
*H04W 8/24* (2009.01)
*H04W 80/02* (2009.01)
*H04W 88/14* (2009.01)
*H04W 92/20* (2009.01)

(52) U.S. Cl.
CPC ........... *H04W 8/24* (2013.01); *H04W 56/001* (2013.01); *H04W 76/27* (2018.02); *H04W 80/02* (2013.01); *H04W 88/14* (2013.01); *H04W 92/20* (2013.01)

(58) Field of Classification Search
CPC .... H04W 88/14; H04W 92/20; H04L 27/2607
USPC ................ 370/329, 328, 338, 341, 345, 350
See application file for complete search history.

(56) References Cited

U.S. PATENT DOCUMENTS

| | | | |
|---|---|---|---|
| 2009/0285178 A1* | 11/2009 | Chin | H04W 36/18 370/331 |
| 2014/0112308 A1* | 4/2014 | Kwon | H04W 56/0045 370/331 |
| 2015/0043543 A1* | 2/2015 | Uchino | H04W 56/0045 370/336 |
| 2015/0189610 A1* | 7/2015 | Siomina | H04L 5/14 370/280 |
| 2015/0237648 A1* | 8/2015 | Zhang | H04W 72/04 370/329 |
| 2016/0112975 A1 | 4/2016 | Dinan | |
| 2018/0115453 A1* | 4/2018 | Sadek | H04W 56/001 |
| 2019/0222411 A1* | 7/2019 | Xie | H04W 72/12 |
| 2019/0394825 A1* | 12/2019 | Byun | H04W 72/042 |
| 2020/0084663 A1* | 3/2020 | Park | H04W 76/12 |

* cited by examiner

OVER-THE-AIR SYNCHRONIZATION IN MOBILE INTEGRATED ACCESS AND BACKHAUL COMMUNICATIONS

CROSS REFERENCE TO RELATED APPLICATION

This Application hereby claims priority under 35 U.S.C. § 119 to U.S. Provisional Patent Application No. 62/900,257, filed on Sep. 13, 2019, the contents of which are incorporated herein in their entirety.

FIELD OF THE DISCLOSURE

Aspects of the present disclosure relate to wireless communications, and more particularly, to techniques for over-the-air synchronization of integrated access and backhaul (IAB) communications.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved IAB synchronization.

Certain aspects provide a method for wireless communications by a network entity. The method generally includes receiving, from a first wireless node, an indication of a value of a timing adjustment factor associated with a communication between the first wireless node and a second wireless node and communicating with the first wireless node or the second wireless node based on the value of the timing adjustment factor.

Certain aspects provide a method for wireless communications by a first wireless node. The method generally includes determining a value of a timing adjustment factor associated with a communication between the first wireless node and a second wireless node. The method also includes outputting, for transmission to at least one of a network entity or at least one wireless node, an indication of the value of the timing adjustment factor, wherein the network entity controls operations of the first wireless node and the second wireless node. The method further includes communicating with the second wireless node based on the value of the timing adjustment factor.

Certain aspects provide a method for wireless communications by a network entity. The method generally includes determining a value of a timing adjustment factor for a first wireless node to use for communicating with a second wireless node. The method also includes outputting, for transmission to the first wireless node or the second wireless node, an indication of the value of the timing adjustment factor. The method further includes after outputting the indication, communicating with the first wireless node or the second wireless node based on the value of the timing adjustment factor.

Certain aspects provide a method for wireless communications by a first wireless node. The method generally includes receiving, from a network entity or at least one wireless node, an indication of a value of a timing adjustment factor associated with a communication between the first wireless node and a second wireless node, wherein the network entity controls operations of the first wireless node and the second wireless node. The method also includes communicating with the second wireless node based on the value of the timing adjustment factor.

Certain aspects provide an apparatus for wireless communications by a network entity. The apparatus generally includes an interface configured to receive, from a first wireless node, an indication of a value of a timing adjustment factor associated with a communication between the first wireless node and a second wireless node and a processing system configured to communicate with the first wireless node or the second wireless node based on the value of the timing adjustment factor.

Certain aspects provide an apparatus for wireless communications by a first wireless node. The method generally includes a processing system configured to determine a value of a timing adjustment factor associated with a communication between the first wireless node and a second wireless node and an interface configured to output, for transmission to at least one of a network entity or at least one wireless node, an indication of the value of the timing adjustment factor, wherein the network entity controls operations of the first wireless node and the second wireless node, wherein the processing system is further configured to communicate with the second wireless node based on the value of the timing adjustment factor.

Certain aspects provide an apparatus for wireless communications by a network entity. The apparatus generally includes a processing system configured to determine a value of a timing adjustment factor for a first wireless node to use for communicating with a second wireless node and an interface configured to output, for transmission to the first wireless node or the second wireless node, an indication of the value of the timing adjustment factor, wherein after outputting the indication, the processing system is further configured to communicate with the first wireless node or the second wireless node based on the value of the timing adjustment factor.

Certain aspects provide an apparatus for wireless communications by a first wireless node. The method generally includes an interface configured to receive, from a network entity or at least one wireless node, an indication of a value of a timing adjustment factor associated with a communication between the first wireless node and a second wireless node, wherein the network entity controls operations of the first wireless node and the second wireless node and a processing system configured to communicate with the second wireless node based on the value of the timing adjustment factor.

Certain aspects provide an apparatus for wireless communications by a network entity. The apparatus generally includes means for receiving, from a first wireless node, an indication of a value of a timing adjustment factor associated with a communication between the first wireless node and a second wireless node and means for communicating with the first wireless node or the second wireless node based on the value of the timing adjustment factor.

Certain aspects provide an apparatus for wireless communications by a first wireless node. The method generally includes means for determining a value of a timing adjustment factor associated with a communication between the first wireless node and a second wireless node, means for outputting, for transmission to at least one of a network entity or at least one wireless node, an indication of the value of the timing adjustment factor, wherein the network entity controls operations of the first wireless node and the second wireless node, and means for communicating with the second wireless node based on the value of the timing adjustment factor.

Certain aspects provide an apparatus for wireless communications by a network entity. The apparatus generally includes means for determining a value of a timing adjustment factor for a first wireless node to use for communicating with a second wireless node, means for outputting, for transmission to the first wireless node or the second wireless node, an indication of the value of the timing adjustment factor, and means for communicating, after outputting the indication, with the first wireless node or the second wireless node based on the value of the timing adjustment factor.

Certain aspects provide an apparatus for wireless communications by a first wireless node. The method generally includes means for receiving, from a network entity or at least one wireless node, an indication of a value of a timing adjustment factor associated with a communication between the first wireless node and a second wireless node, wherein the network entity controls operations of the first wireless node and the second wireless node and means for communicating with the second wireless node based on the value of the timing adjustment factor.

Certain aspects provide a computer-readable medium for wireless communications by a network entity. The computer-readable medium generally includes codes executable to determine a value of a timing adjustment factor associated with a communication between the first wireless node and a second wireless node, output, for transmission to at least one of a network entity or at least one wireless node, an indication of the value of the timing adjustment factor, wherein the network entity controls operations of the first wireless node and the second wireless node, and communicate with the second wireless node based on the value of the timing adjustment factor.

Certain aspects provide a computer-readable medium for wireless communications by a first wireless node. The computer-readable medium generally includes codes executable to determine a value of a timing adjustment factor for a first wireless node to use for communicating with a second wireless node, output, for transmission to the first wireless node or the second wireless node, an indication of the value of the timing adjustment factor, and after outputting the indication, communicate with the first wireless node or the second wireless node based on the value of the timing adjustment factor.

Certain aspects provide a computer-readable medium for wireless communications by a network entity. The computer-readable medium generally includes codes executable to receive, from a first wireless node, an indication of a value of a timing adjustment factor associated with a communication between the first wireless node and a second wireless node and communicate with the first wireless node or the second wireless node based on the value of the timing adjustment factor.

Certain aspects provide a computer-readable medium for wireless communications by a first wireless node. The computer-readable medium generally includes codes executable to receive, from a network entity or at least one wireless node, an indication of a value of a timing adjustment factor associated with a communication between the first wireless node and a second wireless node, wherein the network entity controls operations of the first wireless node and the second wireless node and communicate with the second wireless node based on the value of the timing adjustment factor.

Certain aspects provide a network entity. The network entity generally includes a receiver configured to receive, from a first wireless node, an indication of a value of a timing adjustment factor associated with a communication between the first wireless node and a second wireless node and a processing system configured to communicate with the first wireless node or the second wireless node based on the value of the timing adjustment factor.

Certain aspects provide a first wireless node. The first wireless node generally includes a processing system configured to determine a value of a timing adjustment factor associated with a communication between the first wireless node and a second wireless node and a transmitter to transmit an indication of the value of the timing adjustment factor to at least one of a network entity or at least one wireless node, wherein the network entity controls operations of the first wireless node and the second wireless node, wherein the processing system is further configured to communicate with the second wireless node based on the value of the timing adjustment factor.

Certain aspects provide a network entity. The network entity generally includes a processing system configured to determine a value of a timing adjustment factor for a first wireless node to use for communicating with a second wireless node and a transmitter configured transmit an indication of the value of the timing adjustment factor to the first wireless node or the second wireless node, wherein after transmitting the indication, the processing system is further configured to communicate with the first wireless node or the second wireless node based on the value of the timing adjustment factor.

Certain aspects provide a first wireless node. The first wireless node generally includes a receiver configured to receive, from a network entity or at least one wireless node, an indication of a value of a timing adjustment factor associated with a communication between the first wireless node and a second wireless node, wherein the network entity controls operations of the first wireless node and the second wireless node and a processing system configured to communicate with the second wireless node based on the value of the timing adjustment factor.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for over-the-air synchronization of integrated access and backhaul (IAB) communications. In certain wireless communication networks (such as an IAB network of a 5G NR network), L2 or L3 signaling may lack efficient mechanisms for updating or configuring timing adjustment factor, referred to herein as T_delta, to adequately respond to changes in the delays encountered across an IAB network. In other cases, the performance of over-the-air synchronization (adjusting T_delta in response to changes in delays across the IAB network) may depend on the mobility state of a mobile IAB node. Aspects of the present disclosure provide various mechanisms for determining the T_delta value for IAB communications, signaling the T_delta value, or calculating TA values including taking into account the mobility state of IAB nodes, as further described herein.

The following description provides examples of improved IAB synchronization in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
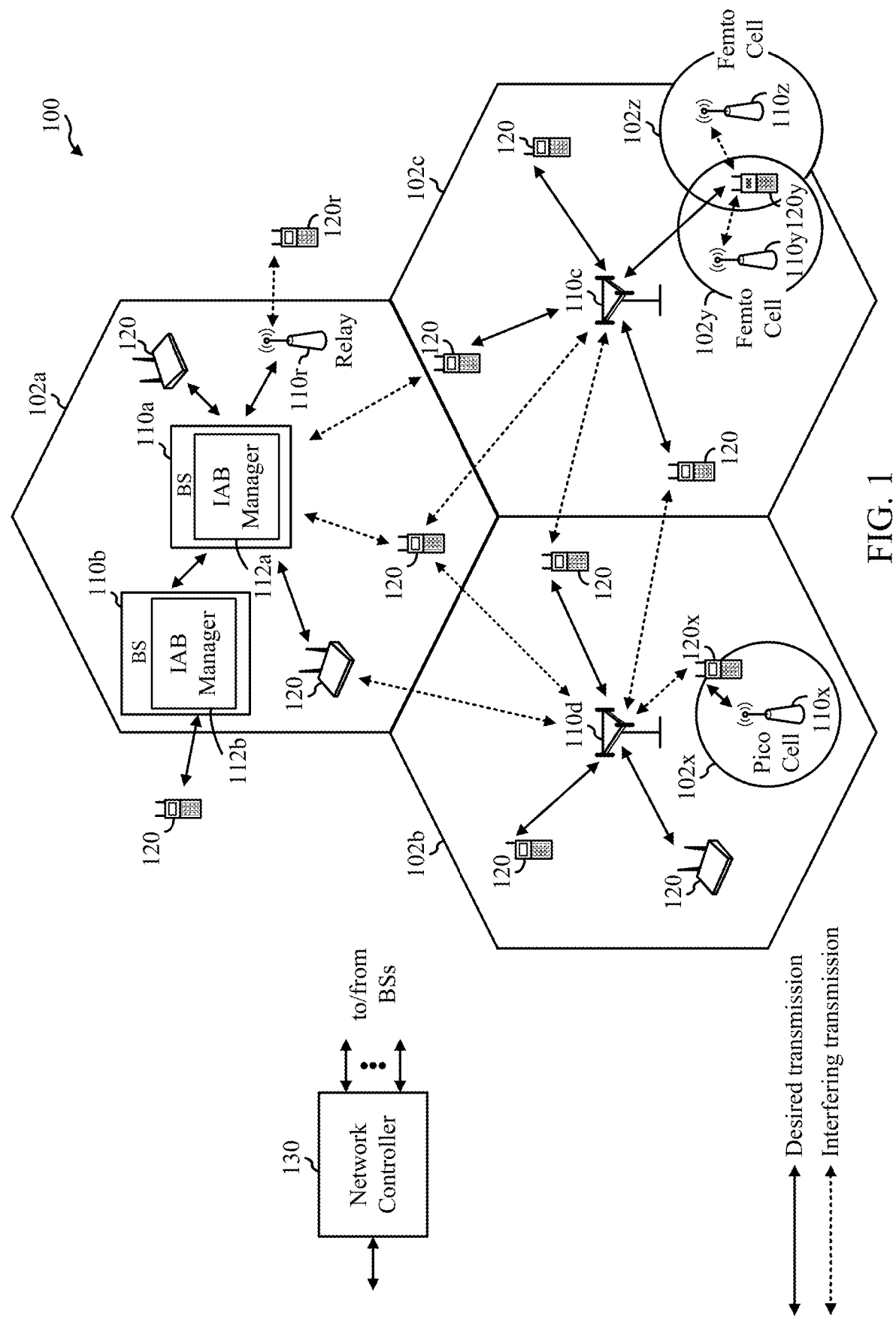
FIG. 1 is a block diagram conceptually illustrating an example telecommunications system, in accordance with certain aspects of the present disclosure.

FIG. 1 illustrates an example wireless communication network 100 in which aspects of the present disclosure may be performed. The wireless communication network 100 may be an NR system (e.g., a 5G NR network). As shown in FIG. 1, an IAB network, as further described herein with respect FIG. 5, may be formed between the BSs 110a and 110b. The BS 110a includes an IAB manager 112a that receives and/or determines a value of a timing adjustment factor (T_delta), in accordance with aspects of the present disclosure. The BS 110b also includes an IAB manager 112b that receives and/or determines a value of a timing adjustment factor (T_delta), in accordance with aspects of the present disclosure.

NR access (e.g., 5G NR) may support various wireless communication services, such as enhanced mobile broadband (eMBB) targeting wide bandwidth (e.g., 80 MHz or beyond), millimeter wave (mmWave) targeting high carrier frequency (e.g., 25 GHz or beyond), massive machine type communications MTC (mMTC) targeting non-backward compatible MTC techniques, and/or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110d and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. The BS 110b may also be a pico/femto BS for a pico/femto cell (not shown). A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
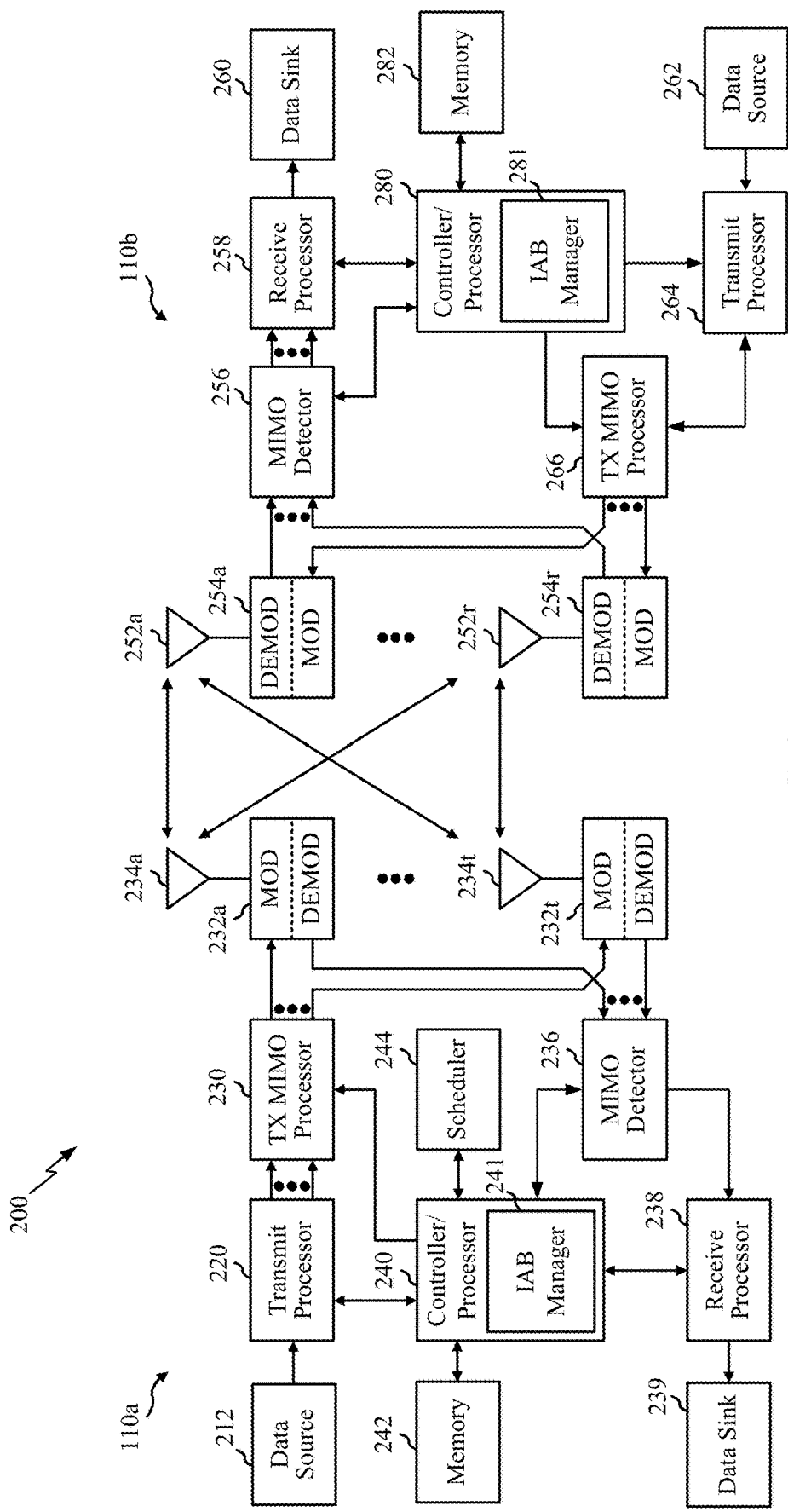
FIG. 2 is a block diagram conceptually illustrating a design of example a base stations (BSs) in communication via wireless access and backhaul links, in accordance with certain aspects of the present disclosure.

FIG. 2 illustrates example components of BS 110a and BS 110b (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the BS 110b, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the BS 110b to a data sink 260, and provide decoded control information to a controller/processor 280.

On the uplink, at BS 110b, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the BS 110b may be received by the antennas 234, processed by the modulators 232, detected by a MIMO detector 236 if applicable, and further processed by a receive processor 238 to obtain decoded data and control information sent by the BS 110b. The receive processor 238 may provide the decoded data to a data sink 239 and the decoded control information to the controller/processor 240.

The memories 242 and 282 may store data and program codes for BS 110a and BS 110b, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 240 of the BS 110a has an IAB manager 241 that receives and/or determines a value of a timing adjustment factor (T_delta), in accordance with aspects of the present disclosure. The controller/processor 280 of the BS 110b has an IAB manager 281 that receives and/or determines a value of a timing adjustment factor (T_delta), in accordance with aspects of the present disclosure. Although shown at the Controller/Processor, other components of the UE 120a and BS 110a may be used to perform the operations described herein.

Figure 3:
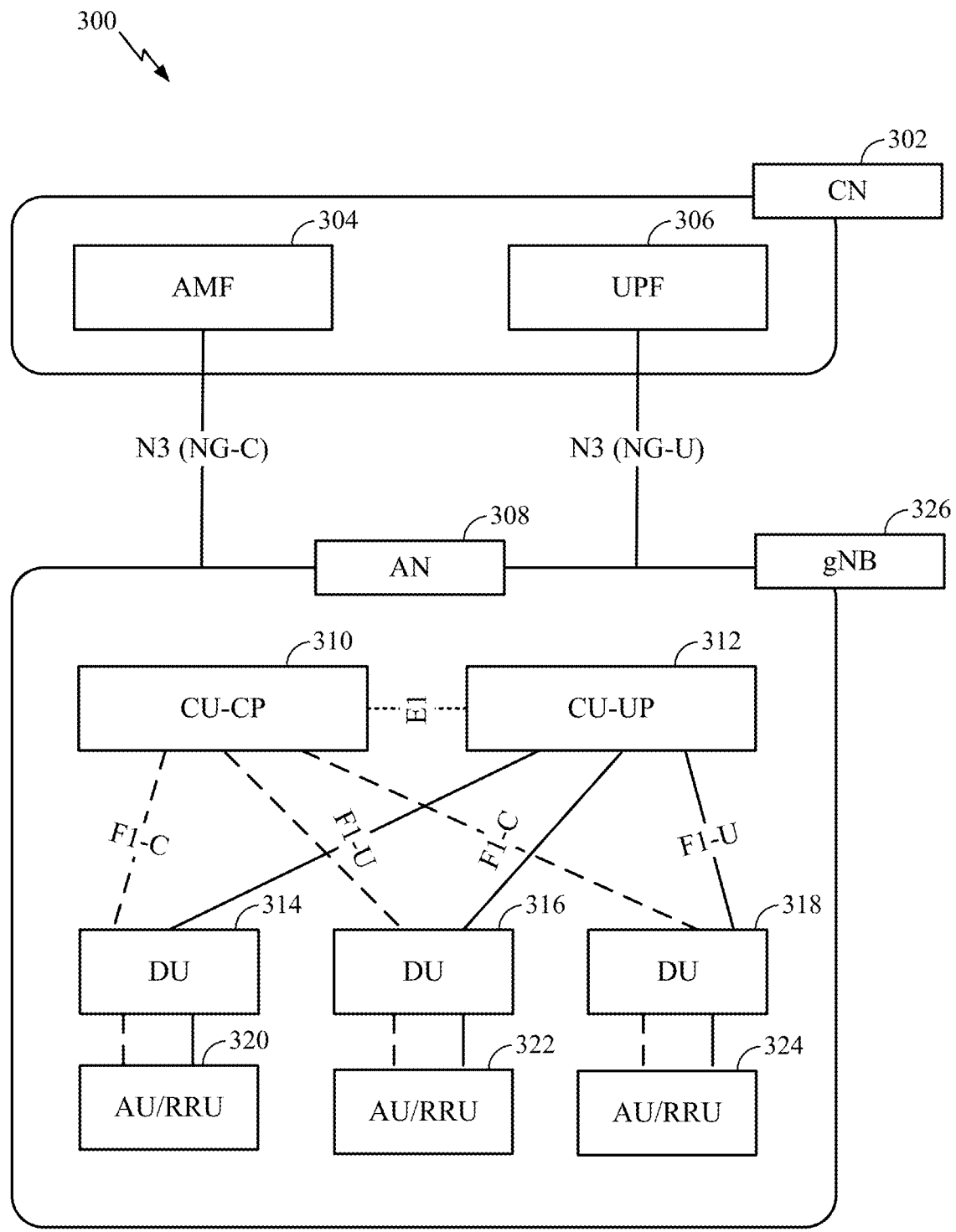
FIG. 3 is a block diagram illustrating an example architecture of a distributed radio access network (RAN), in accordance with certain aspects of the present disclosure.

FIG. 3 illustrates an example architecture of a distributed Radio Access Network (RAN) 300, which may be implemented in the wireless communication network 100 illustrated in FIG. 1. As shown in FIG. 3, the distributed RAN includes Core Network (CN) 302 and Access Node 308.

The CN 302 may host core network functions. CN 302 may be centrally deployed. CN 302 functionality may be offloaded (e.g., to advanced wireless services (AWS)), in an effort to handle peak capacity. The CN 302 may include the Access and Mobility Management Function (AMF) 304 and User Plane Function (UPF) 206. The AMF 304 and UPF 306 may perform one or more of the core network functions.

The AN 308 may communicate with the CN 302 (e.g., via a backhaul interface). The AN 308 may communicate with the AMF 304 via an N2 (e.g., NG-C) interface. The AN 308 may communicate with the UPF 308 via an N3 (e.g., NG-U) interface. The AN 308 may include a central unit-control plane (CU-CP) 310, one or more central unit-user plane (CU-UPs) 312, one or more distributed units (DUs) 314-318, and one or more Antenna/Remote Radio Units (AU/RRUs) 320-324. The CUs and DUs may also be referred to as gNB-CU and gNB-DU, respectively. One or more components of the AN 308 may be implemented in a gNB 326. The AN 308 may communicate with one or more neighboring gNBs.

The CU-CP 310 may be connected to one or more of the DUs 314-318. The CU-CP 310 and DUs 314-318 may be connected via a F1-C interface. As shown in FIG. 3, the CU-CP 310 may be connected to multiple DUs, but the DUs may be connected to only one CU-CP. Although FIG. 3 only illustrates one CU-UP 312, the AN 308 may include multiple CU-UPs. The CU-CP 310 selects the appropriate CU-UP(s) for requested services (e.g., for a UE).

The CU-UP(s) 312 may be connected to the CU-CP 310. For example, the DU-UP(s) 312 and the CU-CP 310 may be connected via an E1 interface. The CU-CP(s) 312 may connected to one or more of the DUs 314-318. The CU-UP (s) 312 and DUs 314-318 may be connected via a F1-U interface. As shown in FIG. 3, the CU-CP 310 may be connected to multiple CU-UPs, but the CU-UPs may be connected to only one CU-CP.

A DU, such as DUs 314, 316, and/or 318, may host one or more TRP(s) (transmit/receive points, which may include an Edge Node (EN), an Edge Unit (EU), a Radio Head (RH), a Smart Radio Head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 314-316 may be connected with one of AU/RRUs 320-324. The DU may be connected to an AU/RRU via each of the F1-C and F1-U interfaces.

The CU-CP 310 may be connected to multiple DU(s) that are connected to (e.g., under control of) the same CU-UP 312. Connectivity between a CU-UP 312 and a DU may be established by the CU-CP 310. For example, the connectivity between the CU-UP 312 and a DU may be established using Bearer Context Management functions. Data forwarding between CU-UP(s) 312 may be via a Xn-U interface.

The distributed RAN 300 may support fronthauling solutions across different deployment types. For example, the RAN 300 architecture may be based on transmit network capabilities (e.g., bandwidth, latency, and/or jitter). The distributed RAN 300 may share features and/or components with LTE. For example, AN 308 may support dual connectivity with NR and may share a common fronthaul for LTE and NR. The distributed RAN 300 may enable cooperation between and among DUs 314-318, for example, via the CU-CP 312. An inter-DU interface may not be used.

Logical functions may be dynamically distributed in the distributed RAN 300. As will be described in more detail with reference to FIG. 4, the Radio Resource Control (RRC) layer, Packet Data Convergence Protocol (PDCP) layer, Radio Link Control (RLC) layer, Medium Access Control (MAC) layer, Physical (PHY) layers, and/or Radio Frequency (RF) layers may be adaptably placed, in the N AN and/or UE.

Figure 4:
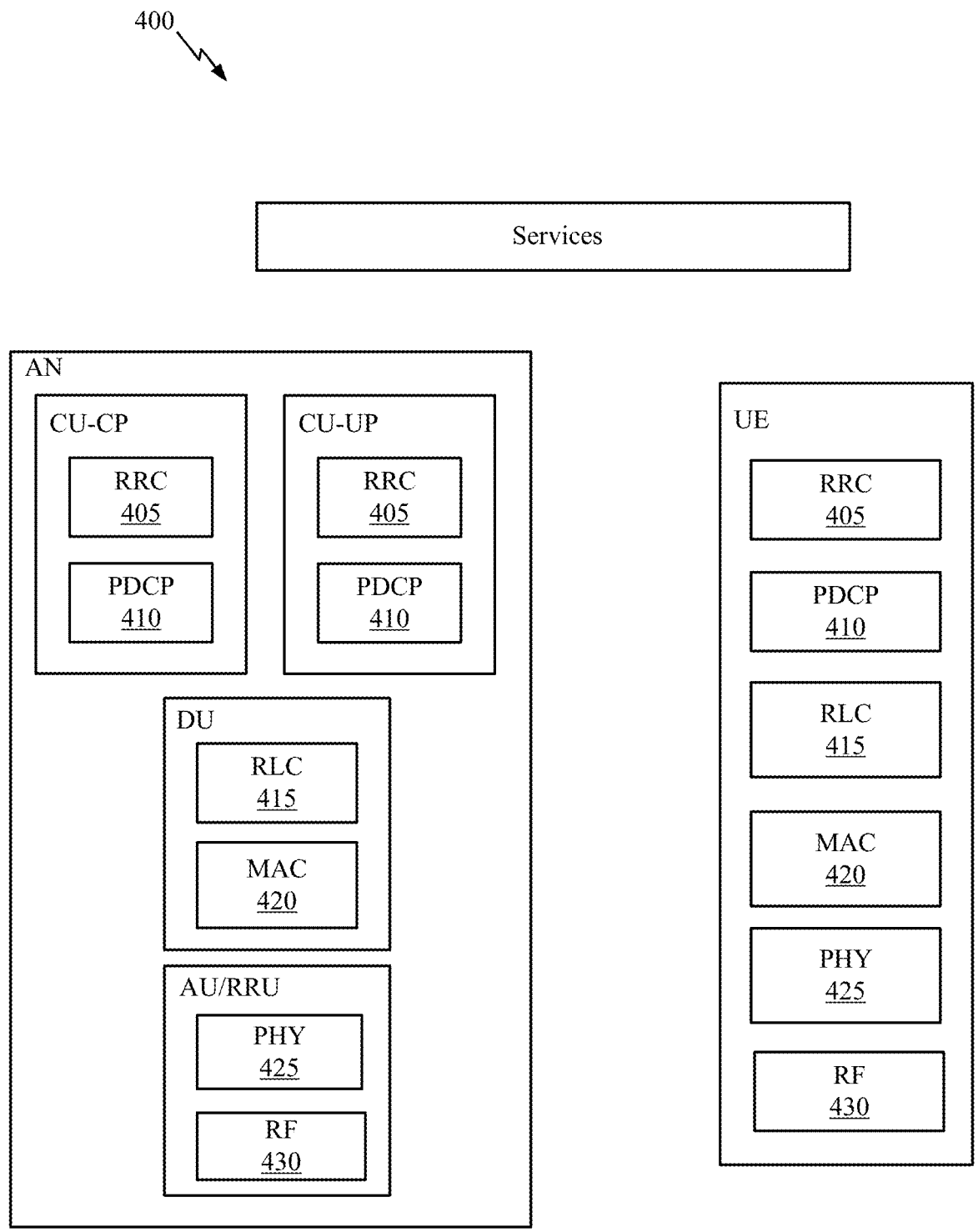
FIG. 4 is a block diagram showing examples for implementing a communication protocol stack in the example RAN architecture, in accordance with certain aspects of the present disclosure.

FIG. 4 illustrates a diagram showing examples for implementing a communications protocol stack 400 in a RAN (e.g., such as the RAN 300), according to aspects of the present disclosure. The illustrated communications protocol stack 400 may be implemented by devices operating in a wireless communication system, such as a 5G NR system (e.g., the wireless communication network 100). In various examples, the layers of the protocol stack 400 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. As shown in FIG. 4, the system may support various services over one or more protocols. One or more protocol layers of the protocol stack 400 may be implemented by the AN and/or the UE.

As shown in FIG. 4, the protocol stack 400 may be split in the AN (e.g., AN 308 in FIG. 3). The RRC layer 405, PDCP layer 410, RLC layer 415, MAC layer 420, PHY layer 425, and RF layer 330 may be implemented by the AN. For example, the CU-CP (e.g., CU-CP 310 in FIG. 3) and the CU-UP (e.g., CU-UP 312 in FIG. 3) each may implement the RRC layer 405 and the PDCP layer 410. A DU (e.g., DUs 314-318 in FIG. 3) may implement the RLC layer 415 and MAC layer 420. The AU/RRU (e.g., AU/RRUs 320-324 in FIG. 3) may implement the PHY layer(s) 425 and the RF layer(s) 430. The PHY layers 425 may include a high PHY layer and a low PHY layer.

The UE may implement the entire protocol stack 400 (e.g., the RRC layer 405, the PDCP layer 410, the RLC layer 415, the MAC layer 420, the PHY layer(s) 425, and the RF layer(s) 430).

In some aspects, an IAB network may support a multi-hop network or a multi-hop wireless backhaul. Additionally, or alternatively, each node of an IAB network may use the same radio access technology (for example, 5G/NR). Additionally, or alternatively, nodes of an IAB network may share resources for access links and backhaul links, such as time resources, frequency resources, and spatial resources. Furthermore, various architectures of IAB nodes or IAB donors may be supported.

In some aspects, an IAB donor may include a central unit (CU) that configures IAB nodes that access a core network via the IAB donor and may include a distributed unit (DU) that schedules and communicates with child nodes of the IAB donor.

In some aspects, an IAB node may include a mobile termination component (MT) that is scheduled by and communicates with a DU of a parent node, and may include a DU that schedules and communicates with child nodes of the IAB node. A DU of an IAB node may perform functions described in connection with base station 110 for that IAB node, and an MT of an IAB node may perform functions described in connection with UE 120 for that IAB node.

Figure 5:
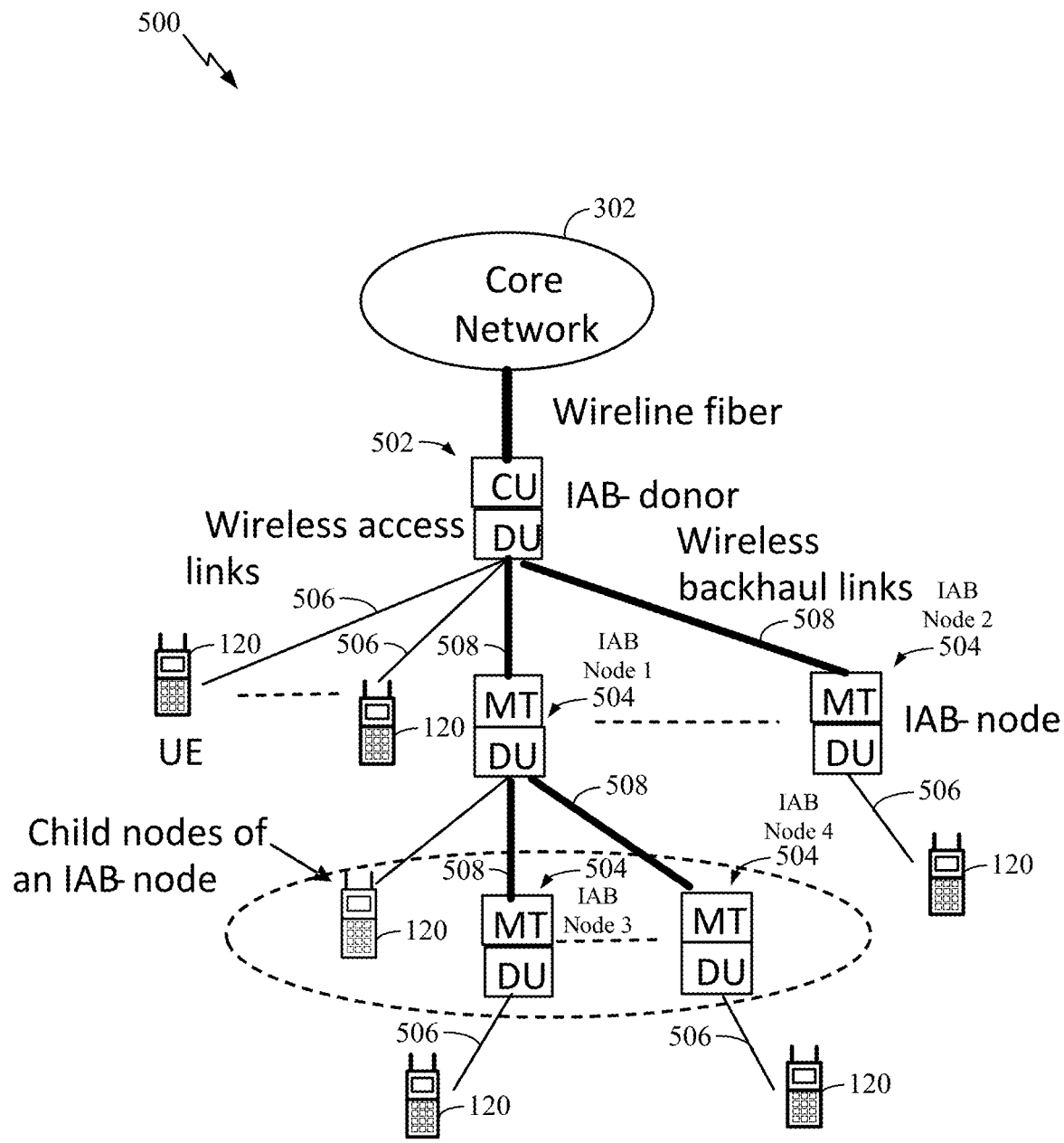
FIG. 5 is a diagram illustrating an example integrated access and backhaul (IAB) network architecture, in accordance with various aspects of the disclosure.

FIG. 5 is a diagram illustrating an example IAB network architecture 500, in accordance with various aspects of the disclosure. As shown in FIG. 5, an IAB network 500 may include an IAB donor 502 that connects to a core network 302 via a wired connection (for example, as a wireline fiber). In certain aspects, an Ng interface of an IAB donor 502 may terminate at the core network 302. Additionally, or alternatively, an IAB donor 502 may connect to one or more devices of the core network 302 that provide a core access and mobility management function (AMF). In some aspects, an IAB donor 302 may include a base station 110, such as an anchor base station, and/or a network controller 130. As shown, an IAB donor 302 may include a CU, which may perform ANC functions or AMF functions. The CU may configure a DU of the IAB donor 502 or may configure one or more IAB nodes 504 (for example, an MT or a DU of an IAB node 504) that connect to the core network via the IAB donor 502. In certain aspects, a CU of an IAB donor 502 may control or configure the entire IAB network that connects to the core network 302 via the IAB donor 502, such as by using control messages or configuration messages (for example, a RRC configuration message, a MAC control element, or an F1 application protocol (F1 AP) message).

As described above, the IAB network may include IAB nodes 504 (shown as IAB nodes 1 through 4) that connect to the core network via the IAB donor 502. As shown, an IAB node 504 may include an MT and may include a DU. The MT of an IAB node 504 (for example, a child node) may be controlled or scheduled by another IAB node 504 (for example, a parent node) or by an IAB donor 502. The DU of an IAB node 504 (for example, a parent node) may control or schedule other IAB nodes 504 (for example, child nodes of the parent node) or UEs 120. Thus, a DU may be referred to as a scheduling node or a scheduling component, and an MT may be referred to as a scheduled node or a scheduled component. In some aspects, an IAB donor 502 may include a DU and not an MT. That is, an IAB donor 405 may configure, control, or schedule communications of IAB nodes 504 or UEs 120. A UE 120 may include only an MT, and not a DU. That is, communications of a UE 120 may be controlled or scheduled by an IAB donor 502 or an IAB node 504 (for example, a parent node of the UE 120).

According to some aspects, certain nodes may be configured to participate in control/scheduling processes. For example in some aspects, when a first node controls or schedules communications for a second node (for example, when the first node provides DU functions for the second node's MT), the first node may be referred to as a parent node of the second node, and the second node may be referred to as a child node of the first node. A child node of the second node may be referred to as a grandchild node of the first node. Thus, a DU of a parent node may control or schedule communications for child nodes of the parent node. A parent node may be an IAB donor 502 or an IAB node 504, and a child node may be an IAB node 504 or a UE 120. Communications of an MT of a child node may be controlled or scheduled by a parent node of the child node.

As further shown in FIG. 5, a link between a UE 120 and an IAB donor 502, or between a UE 120 and an IAB node 504, may be referred to as an access link 506. Each access link 506 may be a wireless access link that provides a UE 120 with radio access to a core network 302 via the IAB donor 502, and potentially via one or more IAB nodes 504.

As further shown in FIG. 5, a link between an IAB donor 502 and an IAB node 504, or between two IAB nodes 504, may be referred to as a backhaul link 508. Each backhaul link 508 may be a wireless backhaul link that provides an IAB node 504 with radio access to a core network via the IAB donor 502, and potentially via one or more other intermediate IAB nodes 504. In some aspects, a backhaul link 508 may be a primary backhaul link or a secondary backhaul link (for example, a backup backhaul link). In some aspects, a secondary backhaul link may be used if a primary backhaul link fails, becomes congested, or becomes overloaded. In an IAB network, network resources for wireless communications (for example, time resources, frequency resources, spatial resources) may be shared between access links 506 and backhaul links 508.

As described above, in a typical IAB network, IAB nodes (for example, non-anchor base stations) are stationary (that is, non-moving). Conversely, in a mobile IAB network, some of the IAB nodes may have mobility (that is, may move around in the IAB network). Such IAB nodes may be referred to as mobile IAB nodes. For example, an IAB node may be installed on a vehicle (for example, a bus, a train, or a car). In a mobile IAB network, there may be a mix of stationary and mobile IAB nodes. In some cases, the mobile IAB nodes may be constrained to be "leaf" nodes in the mobile IAB network. That is, a mobile IAB node may be permitted to be only a last-hop IAB node, with only child access UEs connected to the mobile IAB node. In some other cases, a mobile IAB node also may be permitted to have another IAB node as a child node.

In some examples, a mobile IAB node may provide an independently moving cell site. In such a case, a moving cell site (for example, a vehicle, such as a bus, a train, or a car) can be used for the IAB node to serve surrounding UEs (for example, in an urban area). Here, the mobile IAB node may move relatively randomly, at relatively low speeds (for example, urban city speed), and over a relatively large distance. In this case, the mobility of a given UE (that is not carried with the vehicle) is independent of the mobility of the IAB node (that is, the movement of the UE is not predictable based on the movement of the mobile IAB node), but may also be at relatively low speeds (a speed similar to the mobile IAB node).

In some other examples, a mobile IAB node may provide a jointly moving cell site (for example, a high-speed train). In such a case, a mobile IAB node may be mounted on the moving cell site (for example, on top of a high-speed train) in order to serve UEs on or in the moving cell site (for example, UEs inside the high-speed train). Here, the mobility of the mobile IAB node may be predictable, at relatively high speeds, and over a large distance. In this use case, UEs on or in the moving cell site move jointly with the mobile IAB node (that is, UE movement is predictable based on the movement of the mobile IAB node).

In some other examples, a mobile IAB node may facilitate a platoon, when, for example, a loose group of UEs is generally moving together. In such a case, a single IAB node may provide network connectivity for nearby UEs. For example, a mobile IAB node mounted on a first vehicle driving on a freeway may provide network connectivity for UEs in the first vehicle as well as for UEs in other vehicles driving on the freeway in the same direction and at a similar speed. In such cases, the mobile IAB node connects to the network, while other vehicles might house respective child nodes. Here, the mobile IAB node moves with local predictability, at a relatively constant speed, and over a relatively large distance. Further, the UEs move jointly with the mobile IAB node.

A mobility state of a communication device or node (e.g., an IAB node) may be defined by a number of characteristics. Generally, mobility state can refer to a node's mobility class, movement degree, and/or movement capability. A component's mobility state may be static (e.g., not changing) or dynamic (e.g., changing with time). Mobility states may be dependent upon other factors such that it indicates a relative state with respect to other network components. Mobility states may be based on one or more characteristics as desired or according to design/operational principles. A first characteristic is a level of mobility (for example, stationary, low-speed mobility, medium-speed mobility, high-speed mobility). Mobility levels may generally reflect a point in time velocity, a range of velocities, a running average historical mobility/velocity pattern, or some other characterization of general movement abilities. A second characteristic is a change of or a transition from one mobility state to another (for example, the mobility state of an IAB node may change or transition over time). For example, a mobile IAB node may transition to stationary (for example, from low-speed mobility), or may transition from one mobility class to another (for example, from medium-speed mobility to high-speed mobility). In some instances, there may be a timer associated with such a transition (for example, an IAB node may transition from one state to another within an indicated window of time). Mobility-state characteristics can generally be shared by a device or among devices for enhanced network operations (e.g., using a variety of signals/messages over various interfaces).

Figure 6:
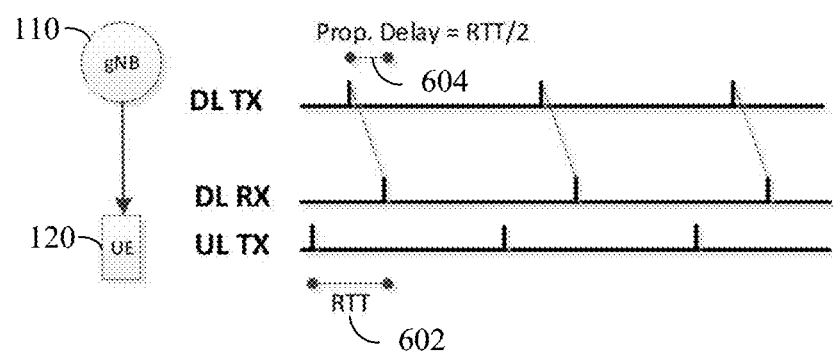
FIG. 6 illustrates a timing diagram of example transmission timing of an access link between a UE and a base station, in accordance with certain aspects of the present disclosure.

FIG. 6 illustrates a timing diagram of example transmission timing of an access link between a UE 120 and a base station 110. The BS 110 may estimate the round-trip-time (RTT) 602 and propagation delay 604 for the UE 120 and BS 110 to communicate over-the-air. The BS 110 may provide, to the UE 120, an UL timing advance (TA) that indicates when the UE 120 is to transmit the UL TX relative to the DL RX timing. For example, the UL TX timing may be offset from the DL RX timing by the TA value. In certain aspects, the uplink frame number for transmission from the UE may start $T_{TA}=(N_{TA}+N_{TA,offset})/T_c$ before the start of the corresponding downlink frame at the UE where $N_{TA}$ and $N_{TA,offset}$ may be configured by the network. The UE 120 may track the DL timing and adjust the UL timing accordingly or inform the BS 110 of any updates to the DL timing. In certain aspects, the UE 120 may be configured to advance the timing (e.g., the TA value=RTT/2) of the UL TX to the base station 110 to enable the DL and UL time-domain resources (e.g., symbols, slots, subframes) to be synchronized at the base station 110. That is, the UE 120 may be configured to transmit the UL TX to the base station at a given time in advance of the DL TX such that the UL TX is received at the base station 110 in alignment with the DL TX.

Figure 7:
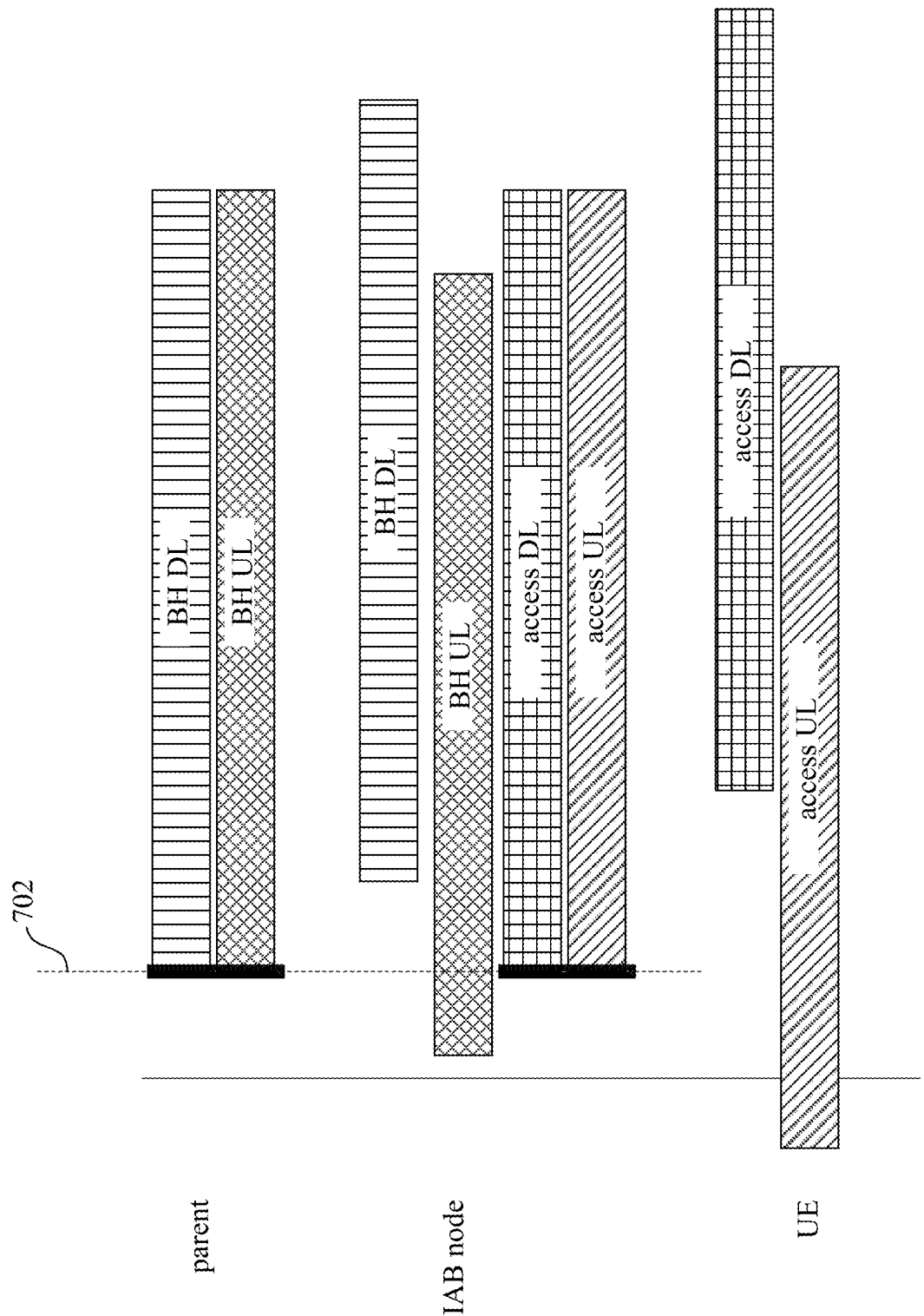
FIG. 7 illustrates a timing diagram of example synchronization of IAB transmissions among an IAB parent node (e.g., an IAB parent or IAB donor node), IAB node, and a UE, in accordance with certain aspects of the present application.

Example Over-the-Air Synchronization in Mobile Integrated Access and Backhaul Communications In certain wireless communication networks (e.g., 5G NR), the IAB donor and IAB nodes may synchronize the timing of backhaul and access transmissions to the IAB donor. For example, FIG. 7 illustrates a timing diagram of example synchronization of IAB transmissions among an IAB parent node (e.g., an IAB parent or IAB donor node), IAB node, and a UE, in accordance with certain aspects of the present application. As shown, the parent node transmits a backhaul (BH) DL transmission to the IAB node, which receives the BH DL transmission according to the propagation delay between the parent node and the IAB node. The IAB node may be configured to advance the timing of the BH UL transmission to align with the first time-domain resource of the BH DL given the propagation delay between the parent node and the IAB node. The IAB node may transmit an access DL transmission to the UE, which receives the access DL transmission according to the propagation delay between the IAB node and the UE. The time-domain resources of the access DL/UL transmissions at the IAB node may be synchronized with the BH DL/UL transmission at the parent node as indicated by line 702. That is, the access DL transmission may be aligned with the BH DL/UL transmission at the parent node, and the UE may be configured to transmit the access UL transmission to the IAB node such that the access UL is received at the IAB node in alignment with the BH DL/UL transmissions.

In order to facilitate the OTA synchronization of an IAB network, the IAB network may take into account the delay introduced by each IAB node, for example, due to processing delays. As an example, an IAB node may set its DL TX timing ahead of its DL RX timing by TA/2+T_delta. That is, the IAB node may adjust the DL TX timing to align with the DL TX of the parent node or donor node by a timing adjustment factor (T_delta).

Figure 8:
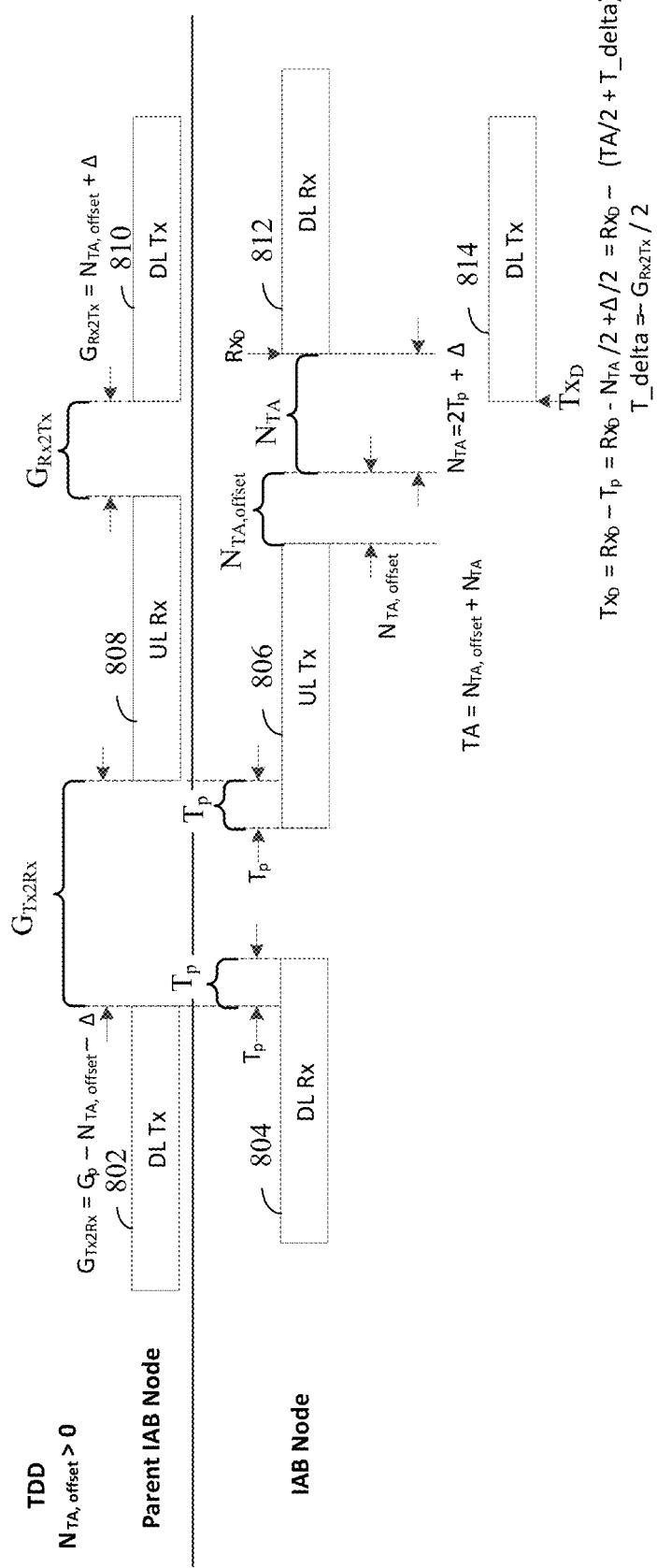
FIG. 8 illustrates a timing diagram of example synchronization of IAB transmissions among an IAB parent node and IAB node, in accordance with certain aspects of the present disclosure.

FIG. 8 illustrates a timing diagram of example synchronization of IAB transmissions among an IAB parent node and IAB node, in accordance with certain aspects of the present disclosure. As shown, an IAB parent node may transmit a first DL TX frame 802 to the IAB node, which receives the DL TX frame at a first DL RX frame 804 according to a propagation delay ($T_p$). The IAB node may transmit an UL TX frame 806 to the parent node, which receives the UL TX at a DL RX frame 808 according to the propagation delay ($T_p$). At the parent node, the DL TX frame 802 and the UL RX frame 808 may be separated in time by Tx-to-Rx gap ($G_{Tx2Rx}$). In certain aspects, the Tx-to-Rx gap may be given by the following expression:

$$G_{Tx2Rx}=G_p-N_{TA,offset}-\Delta \quad (1)$$

where $G_p$ is a guard period, $N_{TA,offset}$ is a timing advance offset for one or more serving cells used to calculate the timing advance, and $\Delta$ is the T_delta value that represents the IAB delay (also referred to herein as the timing adjustment factor), for example, due to various delays encountered at an IAB node. The parent node may transmit a second DL TX frame 810 to the IAB node, which receives the DL TX frame at a DL RX frame 812 (e.g., at $Rx_D$) according to the propagation delay ($T_p$). The UL TX frame 806 and DL RX frame 812 may be separated by the timing advance given by the expression:

$$TA = N_{TA,offset} + N_{TA} \quad (2)$$

where $N_{TA}$ is a timing advance value which may depend on the subcarrier spacing of the frequency resource. At the parent node, the UL RX 808 and the second DL TX 810 may be separated in time by a Rx-to-Tx gap ($G_{Rx2Tx}$). In certain aspects, the Rx-to-Tx gap may be given by the following expression:

$$G_{Rx2Tx} = N_{TA,offset} + \Delta \quad (3)$$

The IAB node may advance a third DL TX frame 814 relative to the DL RX frame 812, for example, at $Tx_D$. In certain aspects, the frame $Tx_D$ may be given by the following expressions:

$$Tx_D = Rx_D - Tp, \quad (4)$$

$$Tx_D = Rx_D - N_{TA}/2 + \Delta/2, \quad (5)$$

$$Tx_D = Rx_D - (TA/2 + T\_delta) \quad (6)$$

where T_delta is a timing adjustment factor used to calculate the DL TX of a first IAB node to a second IAB node (child of the first IAB node) or UE relative to a DL RX from a third IAB node (parent or donor). In certain aspects, T_delta may be equal to $-G_{Rx2Tx}/2$.

While the examples provided herein are described with respect to synchronizing frames to facilitate understanding, aspects of the present disclosure may also be applied to synchronizing OFDM symbols, min-slots, slots, subframes, and/or any other suitable time-domain resource.

The mobility state of a given IAB node may impact operation of the mobile IAB network. For example, the performance of over-the-air synchronization (adjusting T_delta in response to changes in delays across the IAB network) may depend on the mobility state of a mobile IAB node. In certain aspects, knowledge of the mobility state of a given IAB node may be desirable to facilitate improved over-the-air synchronization for an IAB network, especially in determining the T_delta value as further described herein.

The value of T_delta may be signaled dynamically or in a semi-static (e.g., semi-persistent) manner, for example, via L2 (e.g., MAC-CE) or L3 (e.g., RRC) signaling. As used herein, semi-static or semi-persistent may refer to a static configuration or a configuration that is updated infrequently. In certain aspects, the L2 signaling may be more appropriate for dynamic indications of the T_delta value, such as when the IAB nodes have a high degree of mobility. There might be security issues with L2 signaling as L2 signaling is not encrypted. The T_delta value may be generated and/or indicated by the DU of a parent node and signaled to the MT of a child node. The DU may have the flexibility to dynamically and autonomously change T_delta value. The MAC-CE may enable smaller signaling overhead.

In certain aspects, the L3 signaling may be more appropriate for semi-static indications, such as when the IAB nodes have a low degree of mobility. Under L3 signaling, the T_delta value may be indicated by a CU of a donor node to an MT of a child node. The T_delta value will be security-protected due to the encryption of the L3 signaling. The RRC signaling may generate more signaling overhead. However, merely providing the T_delta value via L2 or L3 signaling still lacks efficient mechanisms for updating or configuring the T_delta value to adequately respond to changes in the delays encountered across an IAB network.

Aspects of the present disclosure provide various mechanisms for determining the T_delta value for IAB communications, signaling the T_delta value, or calculating TA values. For example, a DU (e.g., the DU of an IAB parent or child node) may determine the value of T_delta and inform the CU of the updated value of T_delta using an F1-AP message. In other aspects, the CU (e.g., the CU of an IAB donor node) may determine the value of T_delta and indicate the updated value of T_delta to the DU using an F1-AP message. In certain aspects, the CU may indicate to the DU which signaling method (e.g., L2/L3 signaling) carries the T_delta value, and the CU may provide a timing advance configuration indicating a T_delta value.

According to certain aspects, the DU may indicate to the CU which signaling methods (e.g., RRC or MAC) that the DU supports for carrying the T_delta value, and the DU may provide a timing advance configuration including a T_delta value. In other aspects, the selection of the signaling method for carrying the T_delta value may depend on the mobility state of an IAB-node, a parent of the IAB node, or a child of the IAB node.

In certain aspects, the IAB node may be configured to average TA values to determine the timing advance for an IAB transmission (e.g., average(TA)/2+T_delta as described above with respect to FIG. 8). For example, T_delta may be given by the target T_delta signaling, and TA may be calculated according to an average of timing advance intervals (e.g., TA1, TA2, TA3 . . . ) updated by a series TA commands. In such a case where an averaged TA value is used, the IAB node may select a time window or number of TA values, which are used for the averaging, based on a mobility state of the IAB-node or other nodes (such as parents or children). Using an averaged TA may be more appropriate in cases where the IAB node is stationary or has a low or medium degree of mobility as the averaging may reduce estimation noise or quantization noise of the synchronization. In other aspects, the IAB node may use the latest value of TA to determine the timing advance for an IAB transmission. For example, T_delta may be given by the latest T_delta signaling, and TA may be the current time interval at the IAB node between the start of UL TX frame i and the start of DL RX frame i, which may be updated by TA command. In cases where averaging and the latest value are supported, the IAB node may select the method of determining the timing advance based on the mobility state of the IAB-node or other nodes (such as parents or children).

Figure 9:
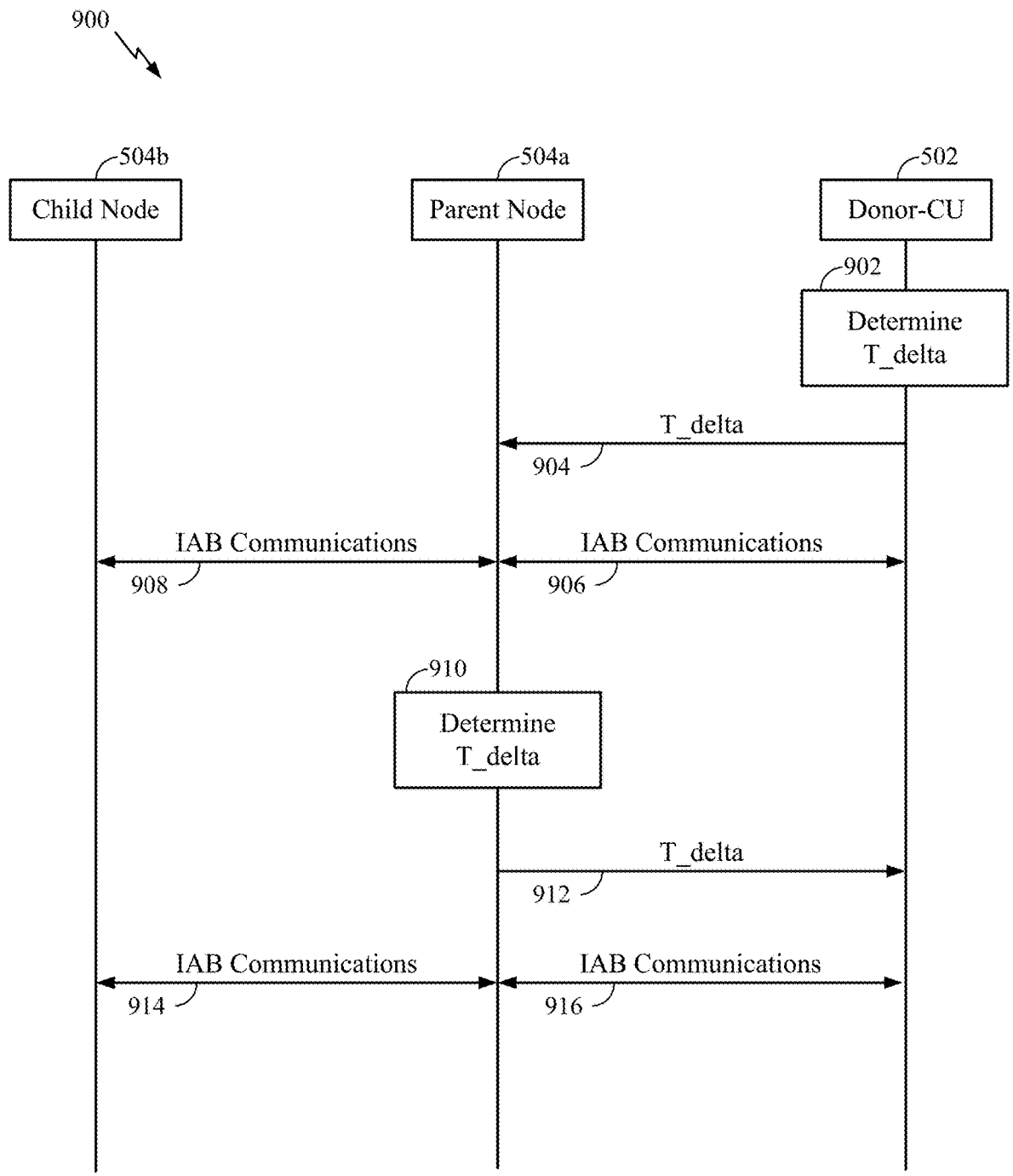
FIG. 9 is call flow diagram illustrating example over-the-air synchronization of an IAB network, in accordance with certain aspects of the present disclosure.

FIG. 9 is call flow diagram illustrating example over-the-air synchronization of an IAB network, in accordance with certain aspects of the present disclosure. In certain aspects, the IAB donor node 502 may control the IAB synchronization configuration including the T_delta value. For example, at 902, the IAB donor node 502 (e.g., the CU of the IAB donor node) may determine a value of a timing adjustment factor (e.g., T_delta) for a first wireless node 504a (e.g., a DU of an IAB parent node) to use for communicating with a second wireless node 504b (e.g., a DU of an IAB child node). As used herein, a wireless node may include a parent or child node in an IAB network such as a base station (e.g., BS 110b) or a DU (e.g., DU 314) of an IAB child/parent node (e.g., IAB node 504). The IAB donor node 502 may determine the value of T_delta based on various factors including information received from other wireless nodes (parents or children), a capability (e.g., multiplexing capabilities) of the first wireless node 504a (or other wireless nodes such as the second wireless node 504b), scheduled and allocated resources of the first wireless node 504a (or other wireless nodes), or an indication received from other wireless nodes (parents or children), as further described herein. At 904, the IAB donor node 502 may send the T_delta value to the first wireless node 504a. At 906, the IAB donor node 502 may communicate with the first wireless node 504a based on the value of T_delta (e.g., IAB donor node 502 may take into account the T_delta value configured at the first wireless node 504a). At 908, the first wireless node 504a may communicate with the second wireless node 504b based on the value of T_delta (e.g., the first wireless node 504a may determine the time-domain resource alignment of $Tx_D$ according to TA/2+T_delta).

Additionally, or alternatively, the IAB node may determine the T_delta value that synchronizes the IAB transmissions as described herein with respect to FIGS. 7 and 8. For example, at 910, the first wireless node 504a may determine the value of T_delta associated with a communication between the first wireless node 504a and the second wireless node 504b. In certain aspects, the first wireless node 504a may determine the value of T_delta based on various information including information received from other wireless nodes (parents or children), a capability (e.g., multiplexing capabilities) of the second wireless node 504b (or other wireless nodes such as the second wireless node 504b), scheduled and allocated resources of the first wireless node 504a (or other wireless nodes), or an indication received from other wireless nodes (parents or children) or the IAB donor node 502, as further described herein. At 912, the first wireless node 504a may inform the IAB donor node 502 of the updated value of T_delta. For example, the first wireless node 504a may transmit an indication of the value of T_delta via an F1-AP message. At 914, the first wireless node 504a may communicate with the second wireless node 504b based on the value of T_delta. At 916, the IAB donor node 502 may communicate with the first wireless node 504a based on the value of T_delta.

While the examples provided herein are described with respect to configuring a T_delta value of an IAB parent node to facilitate understanding, aspects of the present disclosure may also be applied to other suitable IAB nodes in an IAB network such as configuring a T_delta value of an IAB child node or informing an IAB node of the T_delta value of its child or parent (for example, informing the second wireless node 504b of the T_delta value determined at 902 or 910). For instance, a child IAB-node may indicate its T_delta value to a parent IAB node, which may be used for resource/schedule/GP management at the parent IAB node. The child node may indicate its T_delta value via an UL MAC-CE message to the parent IAB node.

Figure 10:
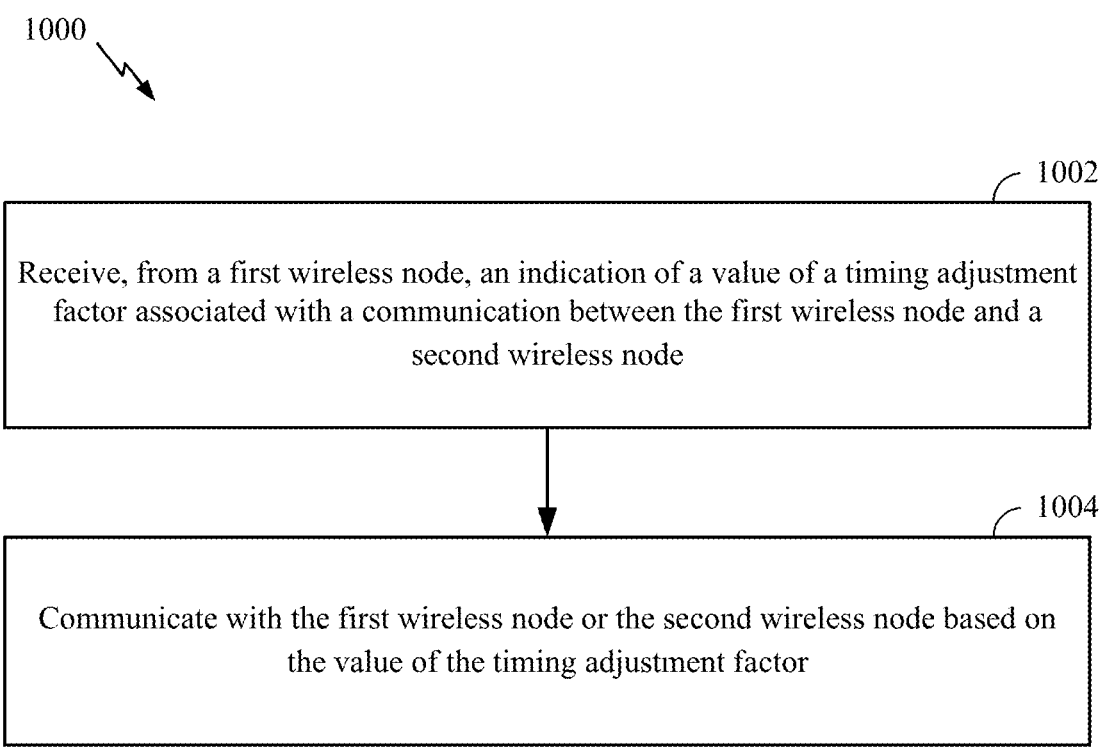
FIG. 10 is a flow diagram illustrating example operations for wireless communication by a network entity, in accordance with certain aspects of the present disclosure.

FIG. 10 is a flow diagram illustrating example operations 1000 for wireless communication, in accordance with certain aspects of the present disclosure. The operations 1000 may be performed, for example, by a network entity (e.g., the BS 110a of FIGS. 1 and 2 or the CU of the IAB donor node 502 of FIG. 5). As used herein, a network entity may include a parent or donor node of an IAB network such as a base station (e.g., BS 110a) or a CU (e.g., CU-CP 310 and/or CU-CP 312) of an IAB donor node (e.g., IAB donor node 502). Operations 1000 may be implemented as software components that are executed and run on one or more processors (e.g., controller/processor 240 of FIG. 2). Further, the transmission and reception of signals by the network entity in operations 1000 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals.

The operations 1000 may begin, at 1002, where the network entity receives, from a first wireless node (e.g., IAB node 504), an indication of a value of a timing adjustment factor (e.g., T_delta) associated with a communication between the first wireless node and a second wireless node (e.g., a parent or child IAB node 504 of the first wireless node). At 1004, the network entity may communicate with the first wireless node or the second wireless node based on the value of the timing adjustment factor.

The network entity may control operations of the first wireless node and the second wireless node such as being the CU of an IAB donor node and performing centralized configuration functions of the CU. That is, the network entity may be configured to control operations of the IAB nodes.

According to certain aspects, the network entity may determine the T_delta value based on the indication and communicate with the first wireless node or second wireless node based on the value of T_delta. For example, the indication of the T_delta value may be an index value (e.g., 0, 1, . . . , N) associated with the T_delta value, and the network entity may calculate the T_delta value using the index value.

In certain aspects, the CU of the IAB donor node may suggest T_delta values to the DU of an IAB node. For example, the network entity of operations 1000 may determine one or more values associated with the timing adjustment factor and output, for transmission to the first wireless node, an indication of the one or more values. That is, the network entity may send the indication of the one or more values to the first wireless node. The indication of the one or more values may be sent via an F1 application protocol message (e.g., a message indicating various IAB synchronization parameters including $N_{TA}$, $N_{TA,offset}$, and/or T_delta). In other aspects, the indication of the one or more values may include the F1 application protocol message.

In other aspects, the CU of the IAB donor node may request the IAB node to update the T_delta value. In cases, the CU of the IAB donor node may determine that the IAB node is out of synchronization with the backhaul timing at the IAB donor node and request that the IAB node update its T_delta value. As another example, the network entity of operations 1000 may output, for transmission to the first wireless node, a request to update the value of the timing adjustment factor. The request may be sent via an F1 application protocol message (e.g., a message including various IAB parameters such as a field that indicates to an IAB node to update its T_delta value). In certain aspects, the request may include the F1 application protocol message.

According to certain aspects, the CU of the IAB donor node may provide rules for the IAB node to determine the T_delta value. For example, the network entity may output, for transmission to the first wireless node, an indication of one or more rules to be used for determining the value of the timing adjustment factor. In certain cases, the one or more rules may be based on a timing reference associated with the first wireless node or the second wireless node. That is, the one or more rules may indicate to select a T_delta value based on a received timing reference (e.g., a sounding reference signal (SRS) or any other suitable reference signal) from various other nodes (e.g., donor node, parent node, or child node). The indication of the one or more rules may be sent via an F1 application protocol message (e.g., a message including various IAB parameters such as one or more fields indicating the rules for determining the T_delta value). In certain aspects, the indication of the one or more rules may include the F1 application protocol message.

In certain aspects, the CU of the IAB donor node may indicate the value of the timing adjustment factor to other wireless nodes such as the second wireless node or a child of the second wireless node. For instance, the network entity may receive, from the second wireless node, an indication of a value of another timing adjustment factor associated with a communication between the second wireless node and a third wireless node (e.g., an IAB child node of the second wireless node). The network entity may then inform the first wireless node of the T_delta value of the second wireless node. For example, the network entity may output, for transmission to the first wireless node, an indication of the value of the other timing adjustment factor. Alternatively, or additionally, the network entity may determine a value of another timing adjustment factor associated with a communication between the second wireless node and a third wireless node and output, for transmission to the first wireless node, an indication of the value of the other timing adjustment factor As the IAB nodes may support various signaling methods (e.g., signaling protocols including the protocol layers described herein with respect to FIG. 4) to indicate a value of T_delta, the CU of the IAB donor node may select a signaling method that carries the T_delta value and inform the IAB nodes of this selection. The signaling method may provide a method of indicating a value of T_delta between the IAB donor node and another IAB node or between IAB nodes. For instance, the network entity of operations 1000 may select a signaling method among a plurality of signaling methods. Each of the signaling methods may include a method of indicating the value of the timing adjustment factor between the network entity and the first wireless node. The network entity may output, for transmission to the first wireless node, an indication of the selected signaling method. The signaling method may be used to provide the value of the timing adjustment factor on a semi-static or dynamic basis. For instance, the network entity may output, for transmission to the first wireless node, an update to the value of the timing adjustment factor on a semi-static or dynamic basis via the signaling method. In other examples, the network entity may receive from the first wireless node an updated value of the timing adjustment factor on a semi-static or dynamic basis.

The signaling method may be an RRC signaling method or a MAC signaling method. That is, the signaling method may include a message of an RRC layer or a MAC layer, for example, as described herein with respect to FIG. 4. In other aspects, the signaling method may include a message of L2 or L3 layer. The message of the signaling method may include the indication of the value or the updated value of the timing adjustment factor.

In certain aspects, the IAB donor node may receive the signaling capability of the IAB node and select the signaling method that carries the T_delta value according to the IAB node's capability. For example, the network entity of operations 1000 may receive, from the first wireless node, capability information indicating that the first wireless node supports receiving a configuration of the timing adjustment factor via the signaling method. The network entity may perform the selection of the signaling method based on the capability information. The configuration of the timing adjustment factor may include an indication of a value of T_delta including an initial value or a subsequent value.

According to certain aspects, the IAB donor node may select the signaling method that carries the T_delta value based on a mobility state of the IAB node or other IAB nodes. For example, the network entity of operations 1000 may perform the selection of the signaling method based on a mobility state of at least one of the first wireless node or the second wireless node and output, for transmission to the first wireless node, an indication of the selected signaling method. As an example, if the first wireless node is stationary or has a low or medium degree of mobility, the network entity may select the RRC protocol layer for indicating the T_delta value, which provides a semi-static signaling method or infrequent updates to the T_delta value. In other cases, where the first wireless node has a medium or high degree of mobility, the network entity may select the MAC protocol layer for indicating the T_delta value, which provides a dynamic signaling method for configuring T_delta.

In certain aspects, for example, where the TA value is averaged or combined (e.g., filtered), the configuration for averaging or combining (e.g., filtering) TA values may be selected based on a mobility state of an IAB node or other nodes (parent or children). The method of selecting the configuration for averaging or combining the TA values may be pre-configured or indicated by the network entity (e.g., the CU). As an example, the network entity of operations 1000 may select, based on a mobility state of the first wireless node or the second wireless node, a time window for averaging TA values. The network entity may communicate with the first wireless node based on the value of the timing adjustment factor and an averaged timing advance value over the time window. The network entity may output, for transmission to the first wireless node, an indication of the time window for averaging TA values. The time window may include a period of time or a series of timing advance intervals where TA was updated. In certain cases, if the first wireless node is stationary or has a low or medium degree of mobility, the network entity may select a relatively long time window for averaging TA values. In other cases, where the first wireless node has a medium or high degree of mobility, the network entity may select a relatively short time window for averaging TA values.

In other aspects, the network entity may select filtering coefficients, based on the mobility state of the IAB node, for combining (e.g., filtering) various TA values. The network entity may output, for transmission to the first wireless node, an indication of the filtering coefficients for combining TA values.

In cases where averaging/filtering TA values and using the latest TA value are both supported, the IAB donor node may select the method of determining the TA value (either averaging/filtering or using the latest TA value) based on the mobility state of the IAB node or other nodes (parent or children). For instance, the network entity of operations 1000 may select how to determine a timing advance value (e.g., averaging/filtering TA value or using the latest TA value) based on a mobility state of the first wireless node or the second wireless node. The network entity may determine the timing advance value based on the selection and communicate with the first wireless node based on the timing advance value and the timing adjustment factor. In certain cases, if the first wireless node is stationary or has a low or medium degree of mobility, the network entity may select averaging/filtering TA values as the method of determining the TA value. In other cases, where the first wireless node has a medium or high degree of mobility, the network entity may select using the current TA value as the method of determining the TA value.

In certain aspects, the network entity of operations 1000 may be in direct communication with the first wireless node. That is, there may be no other IAB nodes serving as a backhaul link between the network entity and the first wireless node. In other aspects, the network entity may be in indirect communication with the first wireless node. That is, there may be one or more other IAB nodes serving as a backhaul link between the network entity and the first wireless node. Expressed another way, the network entity may be in communication with the first wireless node via at least one wireless node. Additionally, or alternatively, the first wireless node may be the DU of the network entity (e.g., the DU of the IAB donor node 502). In certain, a communication between the first wireless node and the second wireless node may include any of the frames described herein with respect to FIG. 8.

Figure 11:
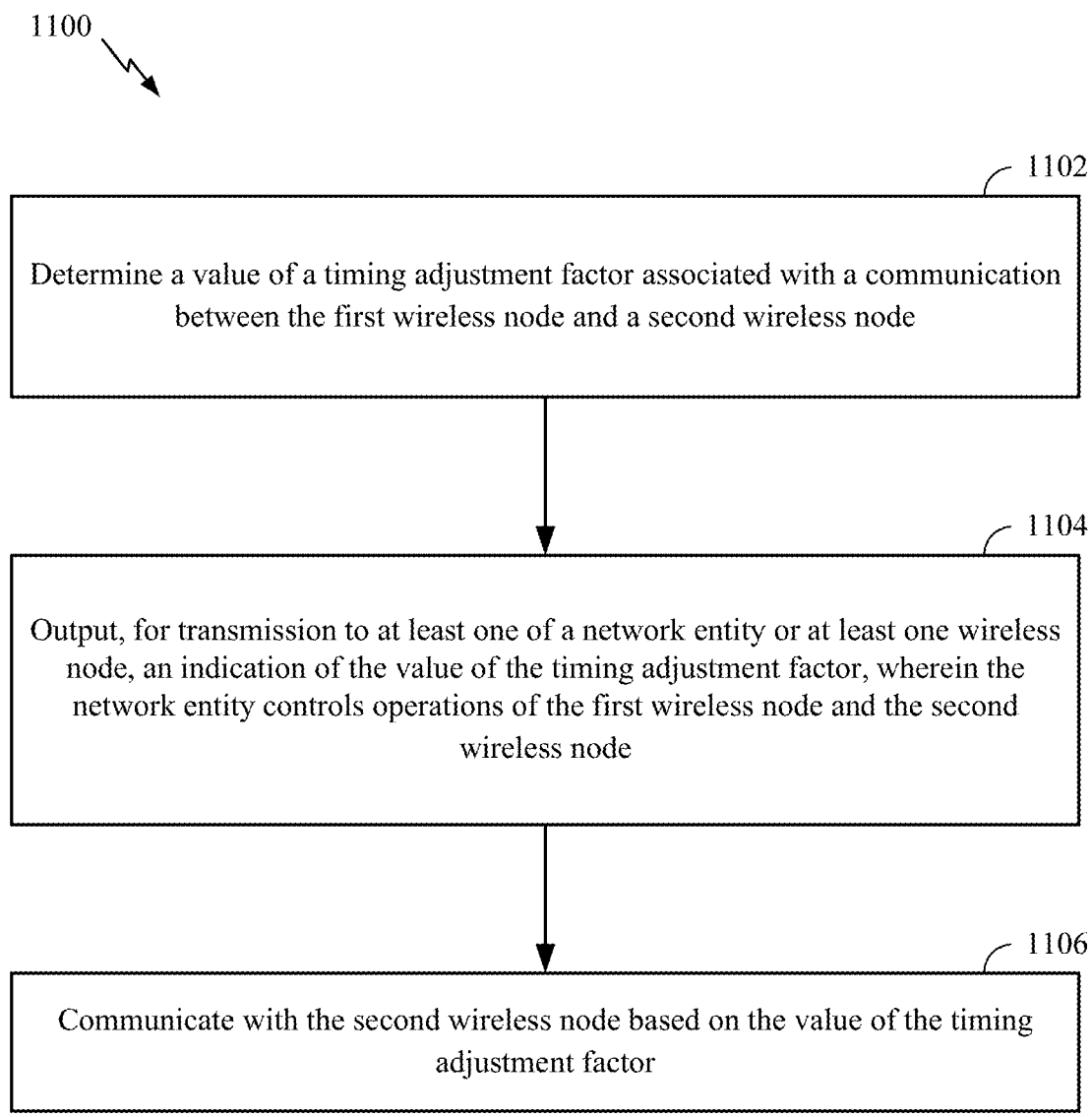
FIG. 11 is a flow diagram illustrating example operations for wireless communication by a wireless node, in accordance with certain aspects of the present disclosure.

FIG. 11 is a flow diagram illustrating example operations 1100 for wireless communication, in accordance with certain aspects of the present disclosure. The operations 1100 may be performed, for example, by a wireless node (e.g., the BS 110b of FIGS. 1 and 2 or the IAB node 504 of FIG. 5). The operations 1100 may be complimentary to the operations 1000 performed by the network entity as described herein with respect to FIG. 10. Operations 1100 may be implemented as software components that are executed and run on one or more processors (e.g., controller/processor 280 of FIG. 2). Further, the transmission and reception of signals by the wireless node in operations 1100 may be enabled, for example, by one or more antennas (e.g., antennas 252 of FIG. 2). In certain aspects, the transmission and/or reception of signals by the wireless node may be implemented via a bus interface of one or more processors (e.g., controller/processor 280) obtaining and/or outputting signals.

The operations 1100 may begin, at 1102, where a first wireless node may determine a value of a timing adjustment factor (e.g., T_delta) associated with a communication between the first wireless node and a second wireless node (e.g., a parent or child IAB node of the first wireless node). At 1104, the first wireless node may output, for transmission to at least one of a network entity (e.g., the CU of IAB donor node 502) or at least one wireless node (e.g., other wireless nodes in the IAB network or the second wireless node), an indication of the value of the timing adjustment factor. The network entity may control operations of the first wireless node and the second wireless node such as being the CU of an IAB donor node and performing centralized configuration functions of the CU. At 1106, the first wireless node may communicate with the second wireless node based on the value of the timing adjustment factor.

In certain aspects, the indication of the T_delta value may be an index value (e.g., 0, 1, . . . , N) associated with the T_delta value, which enables the network entity or the other wireless nodes to calculate the T_delta value using the index value. In certain aspects, the indication of the value of the timing adjustment factor may be sent via an F1 application protocol message (e.g., a message indicating various IAB synchronization parameters including $N_{TA}$, $N_{TA,offset}$, and/or T_delta).

In certain aspects, the DU of an IAB node (which may also include an IAB donor node) may determine the value of T_delta based on various factors or information. For instance, the first wireless node may determine the value of the timing adjustment factor based on at least one of timing information received from the at least one wireless node (including the first wireless node, second wireless node, or other wireless nodes), a capability of the at least one wireless node, resources scheduled for the at least one wireless node, or an indication to update the value of the timing adjustment factor received from the at least one wireless node or the network entity. The capability of the wireless node may be a multiplexing capability including time division multiplexing (TDM), frequency division multiplexing (FDM), code division multiplexing (CDM), space division multiplexing (SDM), and/or full-duplex.

In certain aspects, the DU of the IAB node may receive suggested T_delta values from the CU of an IAB donor node or other IAB nodes. For instance, the first wireless node may receive, from the network entity or the at least one wireless node, an indication of one or more values associated with the timing adjustment factor, and the first wireless node may determine the value of the timing adjustment factor by selecting one of the one or more received values as the value of the timing adjustment factor. The indication of the one or more values may be sent via an F1 application protocol message (e.g., a message indicating various IAB synchronization parameters including $N_{TA}$, $N_{TA,offset}$, and/or T_delta). In other aspects, the indication of the one or more values may include the F1 application protocol message.

In certain aspects, the DU of the IAB node may receive a request to update its T_delta value from the CU of an IAB donor node or other IAB nodes. For example, the first wireless node may receive, from the network entity or the at least one wireless node, a request to update the timing adjustment factor, and the first wireless node may determine the value of the timing adjustment factor in response to receiving the request. The request may be sent via an F1 application protocol message (e.g., a message including various IAB parameters such as a field that indicates to an IAB node to update its T_delta value). In certain aspects, the request may include the F1 application protocol message.

According to certain aspects, the DU of an IAB node may choose T_delta to manage a guard period associated with switching resources/schedules at IAB nodes (e.g., itself, parents, or children). For instance, the first wireless node may determine the value of the timing adjustment factor based on a guard period associated with communications including communications between the first wireless node and the second wireless node. The communications may also include communications between other IAB nodes in the IAB network.

In certain aspects, the DU of the IAB node may receive rules based on which the DU may determine the T_delta value. For instance, the first wireless node may receive, from the network entity or the at least one wireless node, an indication of one or more rules, and the first wireless node may determine the value of the timing adjustment factor based on the received one or more rules. In certain cases, the one or more rules may be based on a timing reference associated with the first wireless node or the second wireless node. That is, the one or more rules may indicate to select a T_delta value based on a received timing reference (e.g., a sounding reference signal (SRS) or any other suitable reference signal) from various other nodes (e.g., donor node, parent node, or child node). The indication of the one or more rules may be sent via an F1 application protocol message (e.g., a message including various IAB parameters such as one or more fields indicating the rules for determining the T_delta value). In certain aspects, the indication of the one or more rules may include the F1 application protocol message.

In certain aspects, the DU of the IAB node may receive another IAB node's T_delta value. For example, the first wireless node may receive, from the network entity or the second wireless node, an indication of a value of another timing adjustment factor associated with a communication between the second wireless node and a third wireless node (e.g., a child of the second wireless node). The first wireless node may communicate with the second wireless node based on the value of the timing adjustment factor and the value of the other timing adjustment factor.

As the IAB nodes/donor nodes may support various signaling methods (e.g., signaling protocols including the protocol layers described herein with respect to FIG. 4) to indicate a value of T_delta, the IAB node may receive, from the CU of the IAB donor node, an indication of the signaling method that carries the T_delta value and monitor the signaling method according to the indication to determine the T_delta value. For instance, the first wireless node of operations 1100 may receive, from the network entity, an indication of a signaling method that includes a method of indicating the value of the timing adjustment factor between the network entity and the first wireless node or between the first wireless node and other IAB nodes. The signaling method may be used to provide the value of the timing adjustment factor on a semi-static or dynamic basis. For instance, the first wireless node may output, for transmission to the network entity, an update to the value of the timing adjustment factor on a semi-static or dynamic basis via the signaling method. In other examples, the first wireless node may receive from the network entity an updated value of the timing adjustment factor on a semi-static or dynamic basis.

The signaling method may be an RRC signaling method or a MAC signaling method. That is, the signaling method may include a message of an RRC layer or a MAC layer, for example, as described herein with respect to FIG. 4. In other aspects, the signaling method may include a message of L2 or L3 layer. The message of the signaling method may include the indication of the value or the updated value of the timing adjustment factor.

In a certain aspects, the IAB node may send its signaling capability to the IAB donor node, which selects the signaling method that carries the T_delta value according to the IAB node's signaling capability. For example, the first wireless node of operations 1100 may output, for transmission to the network entity, capability information indicating that the first wireless node supports receiving a configuration of the timing adjustment factor via the signaling method. The configuration of the timing adjustment factor may include an indication of a value of T_delta including an initial value or a subsequent value.

According to certain aspects, the IAB node may select the signaling method that carries the T_delta value based on a mobility state of the IAB node or other IAB nodes. For instance, the first wireless node of operations 1100 may select a signaling method among a plurality of signaling methods. Each of the signaling methods may include a method of indicating the value of the timing adjustment factor between the network entity and the first wireless node or between the first wireless nodes and other IAB nodes. With respect to 1104, the indication of the value of the timing adjustment factor may include a message of the signaling method. As an example, if the first wireless node is stationary or has a low or medium degree of mobility, the first wireless node may select the RRC protocol layer for indicating the T_delta value, which provides a semi-static signaling method or infrequent updates to the T_delta value. In other cases, where the first wireless node has a medium or high degree of mobility, the first wireless node may select the MAC protocol layer for indicating the T_delta value, which provides a dynamic signaling method for configuring T_delta.

In certain aspects, for example, where the TA value is averaged or combined (e.g., filtered), the configuration for averaging or combining (e.g., filtering) TA values may be selected based on a mobility state of an IAB node or other nodes (parent or children). The method of selecting the configuration for averaging or combining the TA values may be pre-configured or indicated by the network entity (e.g., the CU). As an example, the first wireless node of operations 1100 may select a time window for averaging timing advance values based on a mobility state of the first wireless node or the second wireless node. The first wireless node may communicate with the second wireless node based on the value of the timing adjustment factor and an averaged timing advance value over the selected time window. That is, the first wireless node may determine the averaged timing advance value according to the selected time window and apply this average value in determining the timing advance of an IAB DL RX frame ($Tx_D$). The time window may include a period of time or a series of timing advance intervals where TA was updated. In certain cases, if the first wireless node is stationary or has a low or medium degree of mobility, the first wireless node may select a relatively long time window for averaging TA values. In other cases, where the first wireless node has a medium or high degree of mobility, the first wireless node may select a relatively short time window for averaging TA values.

In certain aspects, the IAB node may receive a time window from the IAB donor node. For instance, the first wireless node of operations 1100 may receive, from the network entity or the other wireless node, an indication of a time window for averaging timing advance values. The first wireless node may communicate with the second wireless node based on the value of the timing adjustment factor and an averaged timing advance value over the received time window.

In other aspects, the IAB node may select filtering coefficients, based on the mobility state of itself or other IAB nodes, for combining (e.g., filtering) various TA values. In certain aspects, the IAB node may receive, from the network entity, filtering coefficients to calculate the TA value from multiple TA values.

In cases where averaging/filtering TA values and using the latest TA value are both supported, the IAB node may select the method of determining the TA value (either averaging/filtering or using the latest TA value) based on the mobility state of the IAB node or other nodes (parent or children). For example, the first wireless node of operations 1100 may select how to determine a timing advance value (e.g., averaging/filtering TA value or using the latest TA value) based on a mobility state of the first wireless node or the second wireless node. The first wireless node may determine the timing advance value based on the selection, and the first wireless node may communicate with the second wireless node based on the timing advance value and the value of the timing adjustment factor. In certain cases, if the first wireless node is stationary or has a low or medium degree of mobility, the first wireless node may select averaging/filtering TA values as the method of determining the TA value. In other cases, where the first wireless node has a medium or high degree of mobility, the first wireless node may select using the current TA value as the method of determining the TA value.

In certain aspects, the first wireless node of operations 1100 may be in direct communication with the network entity and/or the second wireless node. That is, there may be no other IAB nodes serving as a backhaul link between the network entity/second wireless node and the first wireless node. In other aspects, the first wireless node may be in indirect communication with the network entity and/or the second wireless node. That is, there may be one or more other IAB nodes serving as a backhaul link between the network entity/second wireless node and the first wireless node. Expressed another way, the first wireless node may be in communication with the network entity/second wireless node via at least one wireless node. Additionally, or alternatively, the first wireless node may be the DU of the network entity (e.g., the DU of the IAB donor node 502). In certain, a communication between the first wireless node and the second wireless node may include any of the frames described herein with respect to FIG. 8.

Figure 12:
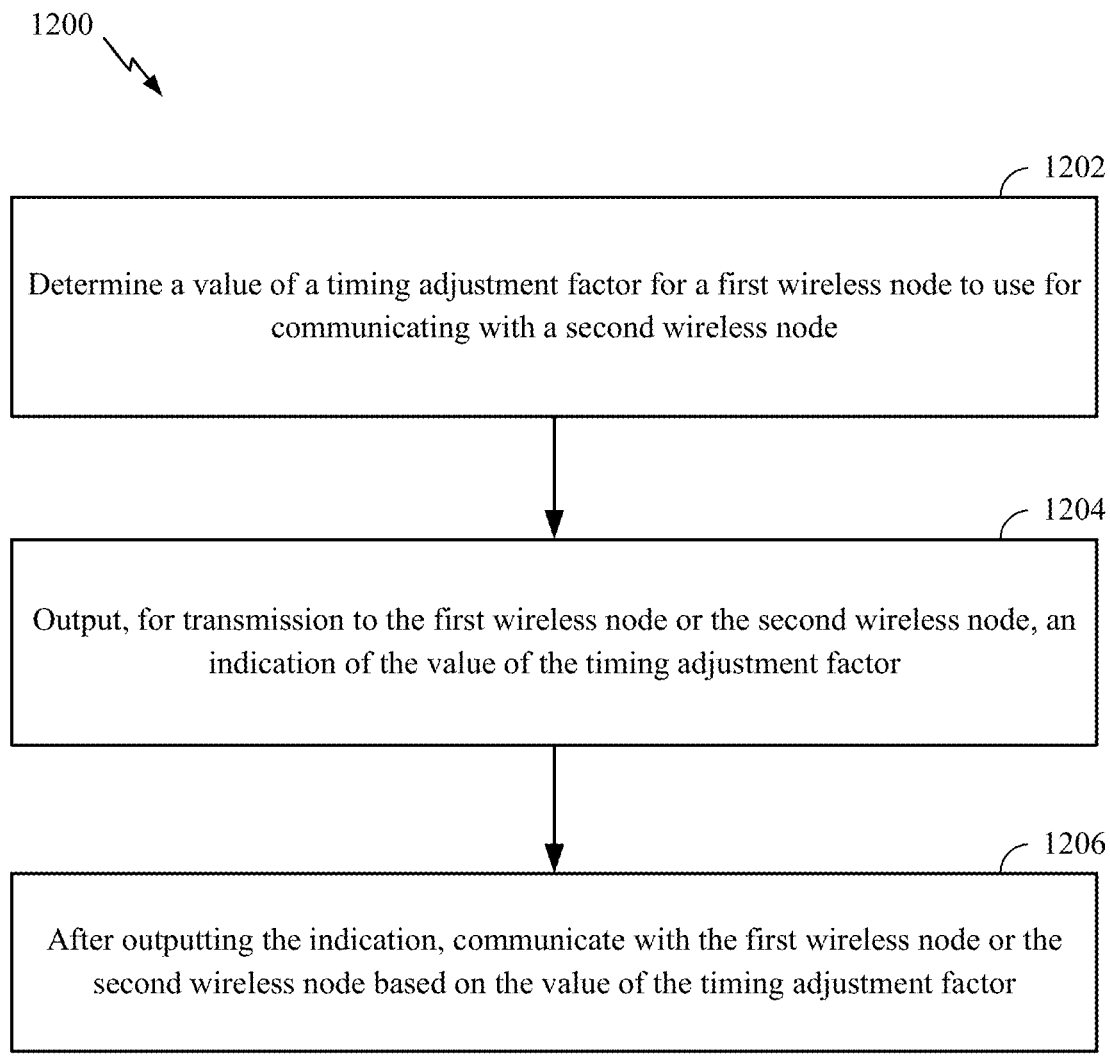
FIG. 12 is a flow diagram illustrating additional example operations for wireless communication by a network entity, in accordance with certain aspects of the present disclosure.

FIG. 12 is a flow diagram illustrating example operations 1200 for wireless communication, in accordance with certain aspects of the present disclosure. The operations 1200 may be performed, for example, by a network entity (e.g., the BS 110*a* of FIGS. 1 and 2 or the CU of the IAB donor node 502 of FIG. 5). Operations 1200 may be implemented as software components that are executed and run on one or more processors (e.g., controller/processor 240 of FIG. 2). Further, the transmission and reception of signals by the network entity in operations 1200 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals.

The operations 1200 may begin, at 1202, where the network entity determines a value of a timing adjustment factor (e.g., T_delta) for a first wireless node (e.g., IAB node 504) to use for communicating with a second wireless node (e.g., a parent or child IAB node of the first wireless node). At 1204, the network entity may output, for transmission to the first wireless node or the second wireless node, an indication of the value of the timing adjustment factor. At 1206, after outputting the indication, the network entity may communicate with the first wireless node or the second wireless node based on the value of the timing adjustment factor.

The network entity may control operations of the first wireless node and the second wireless node such as being the CU of an IAB donor node and performing centralized configuration functions of the CU. That is, the network entity may be configured to control operations of the IAB nodes.

In certain aspects, the indication of the T_delta value may be an index value (e.g., 0, 1, . . . , N) associated with the T_delta value, which enables the first wireless node or the other wireless nodes to calculate the T_delta value using the index value. In certain aspects, the indication of the value of the timing adjustment factor may be sent via an F1 application protocol message (e.g., a message indicating various IAB synchronization parameters including $N_{TA}$, $N_{TA,offset}$, and/or T_delta).

In certain aspects, the CU of an IAB donor node (which may also include an IAB donor node) may determine the value of T_delta based on various factors or information. For instance, the network entity may determine the value of the timing adjustment factor based on at least one of timing information received from at least one wireless node (including the first wireless node, second wireless node, or other wireless nodes) in communication with the network entity, a capability of the at least one wireless node, resources scheduled for the at least one wireless node, or an indication to update the value of the timing adjustment factor received from the at least one wireless node.

In certain aspects, the CU of the IAB donor node may receive suggested T_delta values from the DU of an IAB node in the IAB network. For instance, the network entity may receive, from the first wireless node, an indication of one or more values associated with the timing adjustment factor, and the network entity may determine the value of the timing adjustment factor by selecting one of the one or more received values as the value of the timing adjustment factor. The indication of the one or more values may be sent via an F1 application protocol message (e.g., a message indicating various IAB synchronization parameters including $N_{TA}$, $N_{TA,offset}$, and/or T_delta). In other aspects, the indication of the one or more values may include the F1 application protocol message.

In certain aspects, the CU of the IAB donor node may receive a request to update the T_delta value of an IAB node from the IAB node or other IAB nodes. As an example, the network entity may receive, from the first wireless node, a request to update the value of the timing adjustment factor and determine the value of the timing adjustment factor in response to receiving the request. The request may be sent via an F1 application protocol message (e.g., a message including various IAB parameters such as a field that indicates to an IAB node to update its T_delta value). In certain aspects, the request may include the F1 application protocol message.

According to certain aspects, the CU of the IAB donor node may choose T_delta to manage a guard period associated with switching resources/schedules at IAB nodes (e.g., itself, parents, or children). For example, the network entity may determine the value of the timing adjustment factor based on a guard period associated communications including communications between the first wireless node and the second wireless node. The communications may also include communications between other IAB nodes in the IAB network.

In certain aspects, the CU of the IAB donor node may indicate the value of the timing adjustment factor to other wireless nodes such as the second wireless node or a child of the second wireless node. For instance, the network entity may determine a value of another timing adjustment factor associated with a communication between the second wireless node and a third wireless node and output, for transmission to the first wireless node, an indication of the value of the other timing adjustment factor. Alternatively, or additionally, the network entity may receive, from the second wireless node, an indication of a value of another timing adjustment factor associated with a communication between the second wireless node and a third wireless node (e.g., an IAB child node of the second wireless node). The network entity may then inform the first wireless node of the T_delta value of the second wireless node. For example, the network entity may output, for transmission to the first wireless node, an indication of the value of the other timing adjustment factor.

As the IAB nodes may support various signaling methods (e.g., signaling protocols including the protocol layers described herein with respect to FIG. 4) to indicate a value of T_delta, the CU of the IAB donor node may select a signaling method that carries the T_delta value and inform the IAB nodes of this selection as described herein with respect to FIG. 10. In certain aspects, the IAB donor node may receive the signaling capability of the IAB node and select the signaling method that carries the T_delta value according to the IAB node's capability, as described herein with respect to FIG. 10.

According to certain aspects, the IAB donor node may select the signaling method that carries the T_delta value based on a mobility state of the IAB node, as described herein with respect to FIG. 10.

In cases where averaging/filtering TA values and using the latest TA value are both supported, the IAB donor node may select the method of determining the TA value (either averaging/filtering or using the latest TA value) based on the mobility state of the IAB node or other nodes (parent or children), as described herein with respect to FIG. 10.

In certain aspects, the network entity may be in direct communication with the first wireless node. That is, there may be no other IAB nodes serving as a backhaul link between the network entity and the first wireless node. In other aspects, the network entity may be in indirect communication with the first wireless node. That is, there may be one or more other IAB nodes serving as a backhaul link between the network entity and the first wireless node. Expressed another way, the network entity may be in communication with the first wireless node via at least one wireless node. Additionally, or alternatively, the first wireless node may be the DU of the network entity (e.g., the DU of the IAB donor node 502). In certain, a communication between the first wireless node and the second wireless node may include any of the frames described herein with respect to FIG. 8.

Figure 13:
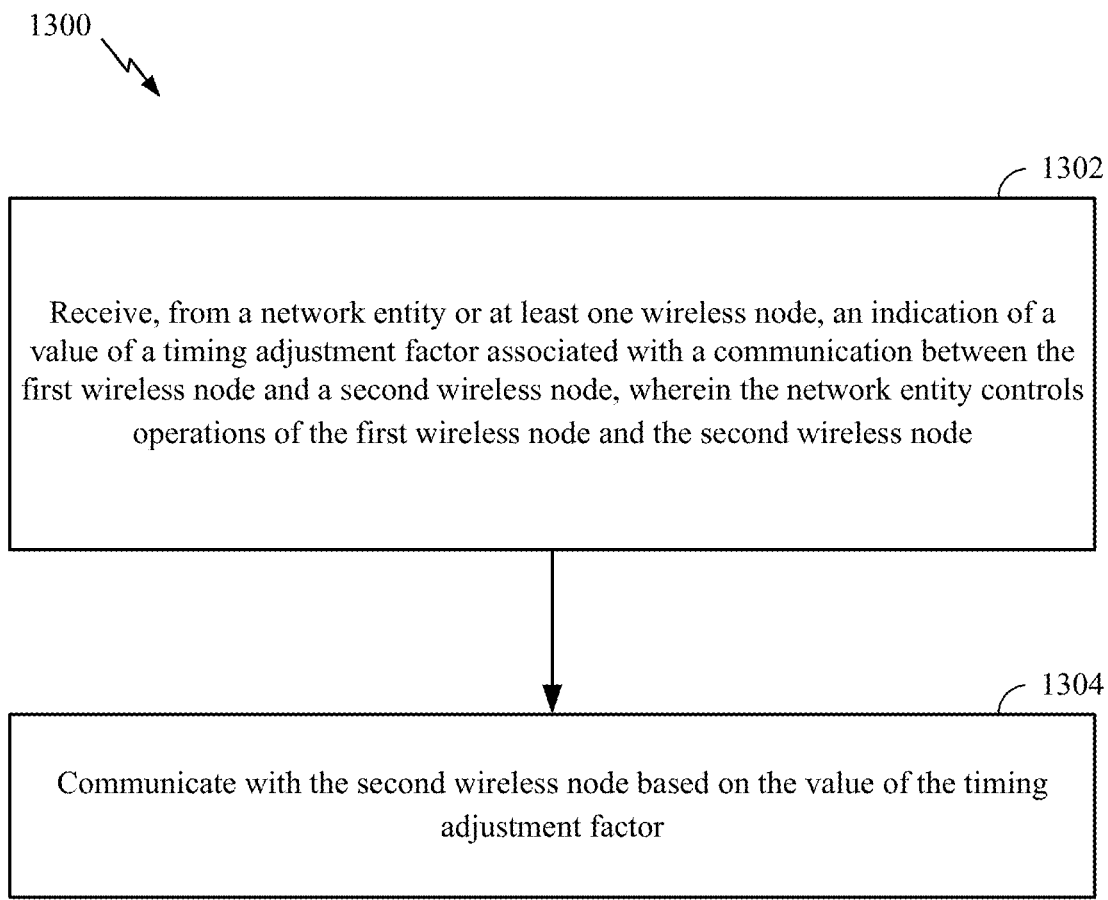
FIG. 13 is a flow diagram illustrating additional example operations for wireless communication by a wireless node, in accordance with certain aspects of the present disclosure.

FIG. 13 is a flow diagram illustrating example operations 1300 for wireless communication, in accordance with certain aspects of the present disclosure. The operations 1300 may be performed, for example, by a wireless node (e.g., the BS 110b of FIGS. 1 and 2 or the IAB node 504 of FIG. 5). The operations 1300 may be complimentary to the operations 1200 performed by the network entity as described herein with respect to FIG. 12. Operations 1300 may be implemented as software components that are executed and run on one or more processors (e.g., controller/processor 280 of FIG. 2). Further, the transmission and reception of signals by the wireless node in operations 1300 may be enabled, for example, by one or more antennas (e.g., antennas 252 of FIG. 2). In certain aspects, the transmission and/or reception of signals by the wireless node may be implemented via a bus interface of one or more processors (e.g., controller/processor 280) obtaining and/or outputting signals.

The operations 1300 may begin, at 1302, where a first wireless node may receive, from a network entity (e.g., the CU of IAB donor node 502) or at least one wireless node (e.g., other wireless nodes in the IAB network or the second wireless node), an indication of a value of a timing adjustment factor associated with a communication between the first wireless node and a second wireless node (e.g., a parent or child IAB node of the first wireless node). The network entity may control operations of the first wireless node and the second wireless node such as being the CU of an IAB donor node and performing centralized configuration functions of the CU. At 1304, the first wireless node may communicate with the second wireless node based on the value of the timing adjustment factor.

According to certain aspects, the wireless node may determine the T_delta value based on the indication and communicate with the second wireless node based on the value of T_delta. For example, the indication of the T_delta value may be an index value (e.g., 0, 1, . . . , N) associated with the T_delta value, and the network entity may calculate the T_delta value using the index value. In certain aspects, the indication of the value of the timing adjustment factor may be sent via an F1 application protocol message (e.g., a message indicating various IAB synchronization parameters including $N_{TA}$, $N_{TA,offset}$, and/or T_delta).

In certain aspects, the DU of the IAB node may suggest T_delta values to the CU of an IAB donor node. For instance, the first wireless node may determine one or more values associated with the timing adjustment factor and output, for transmission to the network entity or at least one wireless node, an indication of the one or more values associated with the timing adjustment factor. The indication of the one or more values may be sent via an F1 application protocol message (e.g., a message indicating various IAB synchronization parameters including $N_{TA}$, $N_{TA,offset}$, and/or T_delta). In other aspects, the indication of the one or more values may include the F1 application protocol message.

In other aspects, the DU of the IAB node may request the IAB donor node to update the T_delta value of itself or other IAB nodes. For example, the first wireless node may output, for transmission to the network entity or at least one wireless node, a request to update the value of the timing adjustment factor. The request may be sent via an F1 application protocol message (e.g., a message including various IAB parameters such as a field that indicates to an IAB node to update its T_delta value). In certain aspects, the request may include the F1 application protocol message.

According to certain aspects, the DU of the IAB node may send its multiplexing capability to the CU of the IAB donor node or other IAB nodes. For instance, the first wireless node may output, to the network entity or at least one wireless node, a multiplexing capability of the first wireless node. The multiplexing capability may enable the CU or other IAB nodes to determine a T_delta value.

In certain aspects, the DU of the IAB node may receive the T_delta value of the other IAB nodes such as the second wireless node or a child of the second wireless node. For instance, the first wireless node may receive, from the network entity or the second wireless node, an indication of a value of another timing adjustment factor associated with a communication between the second wireless node and a third wireless node (e.g., a child of the second wireless node). The first wireless node may communicate with the second wireless node based on the value of the timing adjustment factor and the value of the other timing adjustment factor.

As the IAB nodes may support various signaling methods to indicate a value of T_delta, the DU of the IAB node may select the signaling method that carries the T_delta value and use the protocol layer to update or receive T_delta values as described herein with respect to FIG. 11. In certain aspects, the IAB node may send the signaling capability of the IAB node to the CU of the IAB donor node, as described herein with respect to FIG. 11.

According to certain aspects, the IAB node may select the signaling method that carries the T_delta value based on a mobility state of the IAB node, as described herein with respect to FIG. 11.

In cases where averaging/filtering TA values and using the latest TA value are both supported, the IAB node may select the method of determining the TA value (either averaging/filtering or using the latest TA value) based on the mobility state of the IAB node or other nodes (parent or children), as described herein with respect to FIG. 11. In certain aspects, the IAB node may receive a time window/filtering coefficients from the IAB donor node, as described herein with respect to FIG. 11.

In certain aspects, the first wireless node may be in direct communication with the network entity and/or the second wireless node. That is, there may be no other IAB nodes serving as a backhaul link between the network entity/second wireless node and the first wireless node. In other aspects, the first wireless node may be in indirect communication with the network entity and/or the second wireless node. That is, there may be one or more other IAB nodes serving as a backhaul link between the network entity/second wireless node and the first wireless node. Expressed another way, the first wireless node may be in communication with the network entity/second wireless node via at least one wireless node. Additionally, or alternatively, the first wireless node may be the DU of the network entity (e.g., the DU of the IAB donor node 502). In certain, a communication between the first wireless node and the second wireless node may include any of the frames described herein with respect to FIG. 8.

Figure 14:
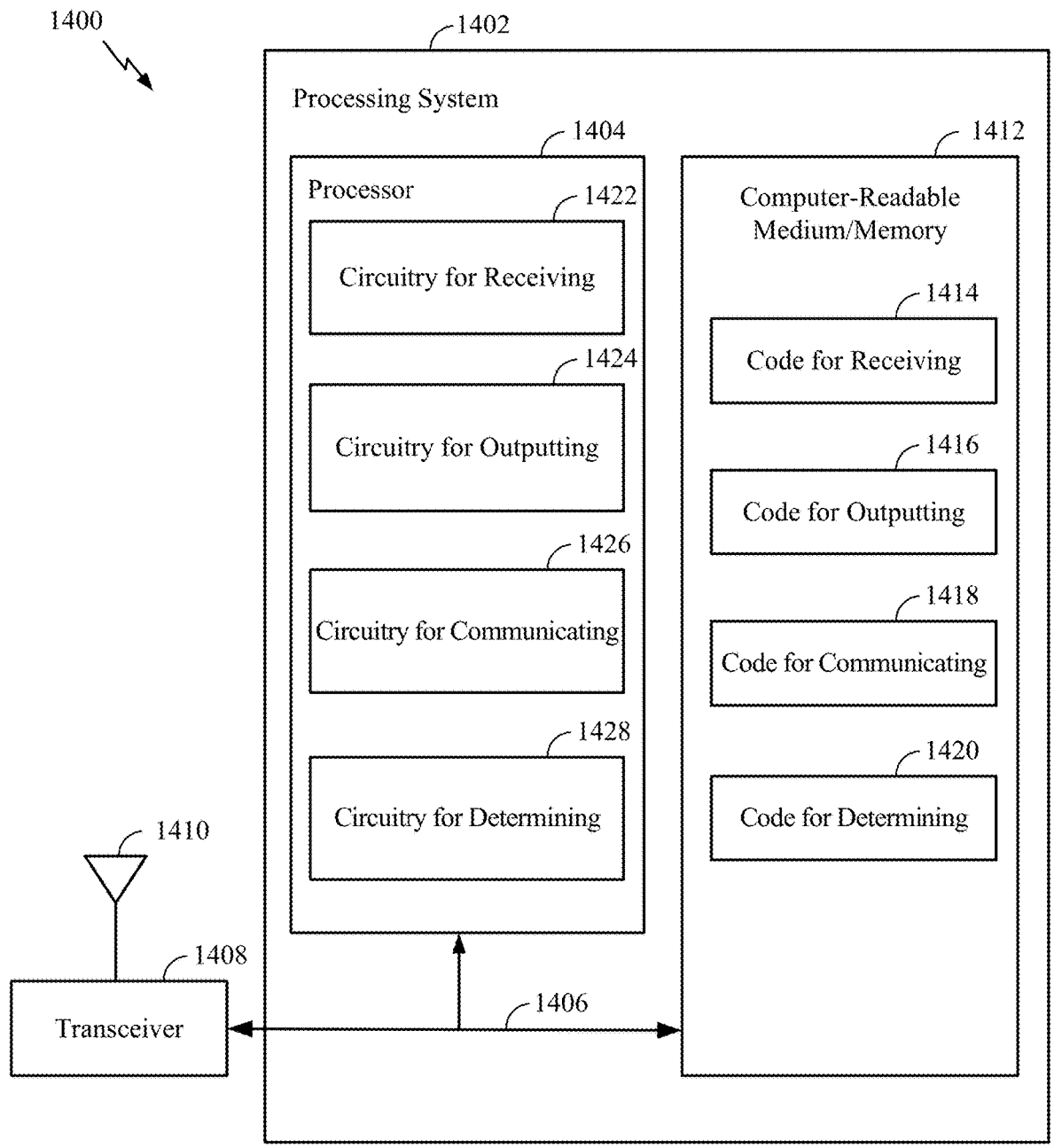
FIG. 14 illustrates a communications device that may include various components configured to perform operations for the techniques disclosed herein in accordance with aspects of the present disclosure.

FIG. 14 illustrates a communications device 1400 (e.g., the BS 110a of FIG. 1 or the CU of the IAB donor node 502 of FIG. 5) that may include various components (e.g., corresponding to means-plus-function components) configured to perform operations for the techniques disclosed herein, such as the operations illustrated in FIG. 10 or 12. The communications device 1400 includes a processing system 1402 coupled to a transceiver 1408 (e.g., a transmitter and/or receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 10 or 12, or other operations for performing the various techniques discussed herein for IAB synchronization. In certain aspects, computer-readable medium/memory 1412 stores code for receiving 1414, code for outputting 1416 (including code for transmitting), code for communicating 1418, and/or code for determining 1420 (including code for selecting). In certain aspects, the processor 1404 has circuitry configured to implement the code stored in the computer-readable medium/memory 1412. The processor 1404 includes circuitry for receiving 1422, circuitry for outputting 1424 (including code for transmitting), circuitry for communicating 1426, and/or circuitry for determining 1428 (including code for selecting).

Figure 15:
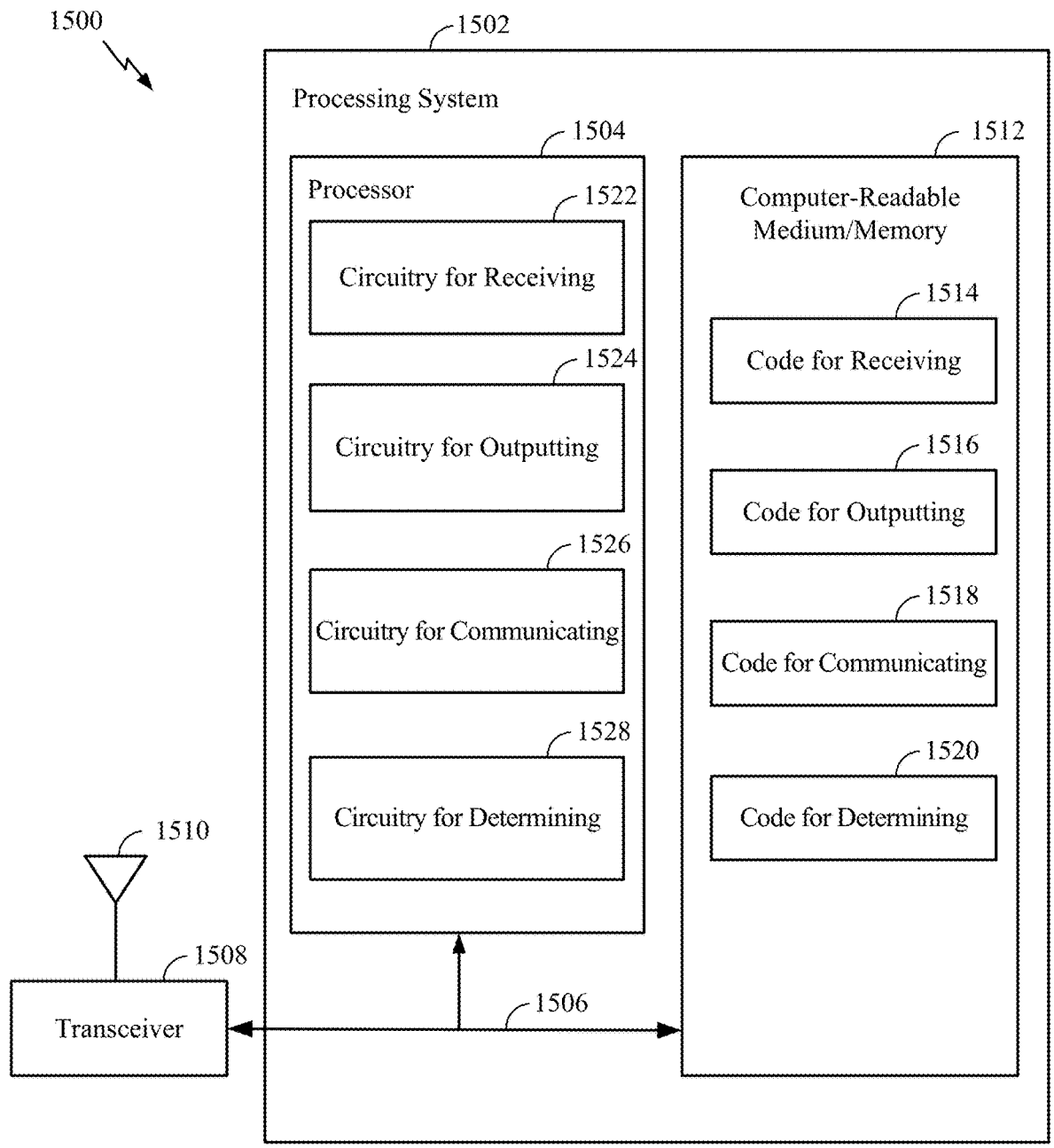
FIG. 15 illustrates a communications device that may include various components configured to perform operations for the techniques disclosed herein in accordance with aspects of the present disclosure.

FIG. 15 illustrates a communications device 1500 (e.g., the BS 110b of FIGS. 1 and 2 or the IAB node 504 of FIG. 5) that may include various components (e.g., corresponding to means-plus-function components) configured to perform operations for the techniques disclosed herein, such as the operations illustrated in FIG. 11 or 13. The communications device 1500 includes a processing system 1502 coupled to a transceiver 1508 (e.g., a transmitter and/or receiver). The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 11 or 13, or other operations for performing the various techniques discussed herein for IAB synchronization. In certain aspects, computer-readable medium/memory 1512 stores code for receiving 1514, code for outputting 1516 (including code for transmitting), code for communicating 1518, and/or code for determining 1520 (including code for selecting). In certain aspects, the processor 1504 has circuitry configured to implement the code stored in the computer-readable medium/memory 1512. The processor 1504 includes circuitry for receiving 1522, circuitry for outputting 1524 (including code for transmitting), circuitry for communicating 1526, and/or circuitry for determining 1528 (including code for selecting).

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 10-13.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus of wireless communication by a network entity, comprising:
an interface configured to receive, from a first wireless node comprising an integrated access and backhaul (IAB) node, an indication of a value of a timing adjustment factor associated with a communication between the first wireless node and a second wireless node, the second wireless node comprising a child IAB node of the first wireless node, wherein the value of the timing adjustment factor is based on a processing delay encountered at at least one of the first wireless node or the second wireless node, and wherein the processing delay encountered at at least one of the first wireless node or the second wireless node is based on a processing or multiplexing capability of at least one of the first wireless node or the second wireless node; and
a processing system configured to communicate with the first wireless node or the second wireless node based on a timing advance value and the value of the timing adjustment factor.

2. The apparatus of claim 1, wherein:
the processing system is further configured to determine one or more values associated with the timing adjustment factor; and
the interface is further configured to output an indication of the one or more values for transmission to the first wireless node.

3. The apparatus of claim 1, wherein:
the interface is further configured to output, for transmission to the first wireless node, a request to update the value of the timing adjustment factor.

4. The apparatus of claim 1, wherein:
the interface is further configured to output, for transmission to the first wireless node, an indication of one or more rules to be used for determining the value of the timing adjustment factor.

5. The apparatus of claim 4, wherein the one or more rules are based on a timing reference associated with the first wireless node or the second wireless node.

6. The apparatus of claim 1, wherein the apparatus is configured to communicate with the first wireless node via at least one wireless node.

7. The apparatus of claim 1, wherein:
the interface is further configured to receive, from the second wireless node, an indication of a value of another timing adjustment factor associated with a communication between the second wireless node and a third wireless node; and
the interface is further configured to output, for transmission to the first wireless node, an indication of the value of the other timing adjustment factor.

8. The apparatus of claim 1, wherein:
the processing system is further configured to select a signaling method among a plurality of signaling methods, wherein each of the signaling methods includes a method of indicating the value of the timing adjustment factor between the network entity and the first wireless node; and
the interface is further configured to output, for transmission to the first wireless node, an indication of the selected signaling method.

9. The apparatus of claim 8, wherein the interface is further configured to output, for transmission to the first wireless node, an update to the value of the timing adjustment factor on a semi-static or dynamic basis via the signaling method.

10. The apparatus according to claim 9, wherein:
the signaling method includes a message of a radio resource control (RRC) layer or a medium access control (MAC) layer, and
the message includes the indication of the value or the updated value of the timing adjustment factor.

11. The apparatus of claim 8, wherein the interface is further configured to receive, from the first wireless node, capability information indicating that the first wireless node supports receiving a configuration of the timing adjustment factor via the signaling method, wherein the selection of the signaling method is based on the capability information.

12. The apparatus of claim 8, wherein the selection of the signaling method is based on a mobility state of at least one of the first wireless node or the second wireless node.

13. The apparatus of claim 1, wherein:
the processing system is further configured to select, based on a mobility state of the first wireless node or the second wireless node, a time window for averaging timing advance values; and
the apparatus is configured to communicate with the first wireless node is based on the value of the timing adjustment factor and an averaged timing advance value over the time window.

14. The apparatus of claim 13, wherein the interface is further configured to output, for transmission to the first wireless node, an indication of the time window for averaging timing advance values.

15. The apparatus of claim 1, wherein the processing system is further configured to:
select how to determine the timing advance value based on a mobility state of the first wireless node or the second wireless node; and
determine the timing advance value based on the selection.

16. An apparatus of wireless communication by a first wireless node comprising an integrated access and backhaul (IAB) node, comprising:
a processing system configured to determine a value of a timing adjustment factor associated with a communication between the first wireless node and a second wireless node, the second wireless node comprising a child IAB node of the first wireless node, wherein the value of the timing adjustment factor is based on a processing delay encountered at at least one of the first wireless node or the second wireless node, and wherein the processing delay encountered at at least one of the first wireless node or the second wireless node is based on a processing or multiplexing capability of at least one of the first wireless node or the second wireless node; and
an interface configured to output, for transmission to at least one of a network entity or at least one wireless node, an indication of the value of the timing adjustment factor, wherein the network entity controls operations of the first wireless node and the second wireless node, wherein:
the processing system is further configured to communicate with the second wireless node based on a timing advance value and the value of the timing adjustment factor.

17. The apparatus of claim 16, wherein the determination of the value of the timing adjustment factor comprises determining the value of the timing adjustment factor based on at least one of:
timing information received from the at least one wireless node,
a capability of the at least one wireless node,
resources scheduled for the at least one wireless node, or
an indication to update the value of the timing adjustment factor received from the at least one wireless node or the network entity.

18. The apparatus of claim 16, wherein:
the interface is further configured to receive, from the network entity or the at least one wireless node, an indication of one or more values associated with the timing adjustment factor; and
the processing system is configured to determine the value of the timing adjustment factor by selecting one of the one or more received values as the value of the timing adjustment factor.

19. The apparatus of claim 16, wherein:
the interface is further configured to receive, from the network entity or the at least one wireless node, a request to update the timing adjustment factor; and
the processing system is configured to determine the value of the timing adjustment factor in response to receiving the request.

20. The apparatus of claim 16, wherein the processing system is configured to determine the value of the timing adjustment factor based on a guard period associated with communications including communications between the first wireless node and the second wireless node.

21. The apparatus of claim 16, wherein:
the interface is further configured to receive, from the network entity or the at least one wireless node, an indication of one or more rules; and
the processing system is configured to determine the value of the timing adjustment factor based on the received one or more rules.

22. The apparatus of claim 21, wherein the one or more rules are based on a timing reference associated with the at least one wireless node.

23. The apparatus of claim 16, wherein the apparatus is configured to communicate with the network entity via the at least one wireless node.

24. The apparatus of claim 16, wherein:
the interface is further configured to receive, from the network entity or the second wireless node, an indication of a value of another timing adjustment factor associated with a communication between the second wireless node and a third wireless node; and
the processing system is configured to communicate with the second wireless node based on the value of the timing adjustment factor and the value of the other timing adjustment factor.

25. The apparatus of claim 16, further wherein:
the processing system is further configured to select a signaling method among a plurality of signaling methods, wherein each of the signaling methods includes a method of indicating the value of the timing adjustment factor between the network entity and the first wireless node; and
the indication of the value of the timing adjustment factor comprises a message of the signaling method.

26. The apparatus of claim 16, wherein:
the processing system is further configured to select a time window for averaging timing advance values based on a mobility state of the first wireless node or the second wireless node; and
the processing system is configured to communicate with the second wireless node based on the value of the timing adjustment factor and an averaged timing advance value over the time window.

27. The apparatus of claim 16, wherein:
the interface is further configured to receive, from the network entity or the at least one wireless node, an indication of a time window for averaging timing advance values; and
the processing system is configured to communicate with the second wireless node based on the value of the timing adjustment factor and an averaged timing advance value over the time window.

28. The apparatus of claim 16, wherein the processing system is further configured to:
- select how to determine the timing advance value based on a mobility state of the first wireless node or the second wireless node; and
- determine the timing advance value based on the selection.

29. An apparatus of wireless communication by a network entity, comprising:
- a processing system configured to determine a value of a timing adjustment factor for a first wireless node comprising an integrated access and backhaul (IAB) node to use for communicating with a second wireless node, the second wireless node comprising a child TAB node of the first wireless node, wherein the value of the timing adjustment factor is based on a processing delay encountered at at least one of the first wireless node or the second wireless node, and wherein the processing delay encountered at at least one of the first wireless node or the second wireless node is based on a processing or multiplexing capability of at least one of the first wireless node or the second wireless node; and
- an interface configured to output, for transmission to the first wireless node or the second wireless node, an indication of the value of the timing adjustment factor, wherein:
- after output of the indication, the processing system is further configured to communicate with the first wireless node or the second wireless node based on a timing advance value and the value of the timing adjustment factor.

30. An apparatus of wireless communication by a first wireless node comprising an integrated access and backhaul (IAB) node, comprising:
- an interface configured to receive, from a network entity or at least one wireless node, an indication of a value of a timing adjustment factor associated with a communication between the first wireless node and a second wireless node, the second wireless node comprising a child TAB node of the first wireless node, wherein the value of the timing adjustment factor is based on a processing delay encountered at at least one of the first wireless node or the second wireless node, wherein the processing delay encountered at at least one of the first wireless node or the second wireless node is based on a processing or multiplexing capability of at least one of the first wireless node or the second wireless node, and wherein the network entity controls operations of the first wireless node and the second wireless node; and
- a processing system configured to communicate with the second wireless node based on a timing advance value and the value of the timing adjustment factor.

* * * * *